US011680739B2

(12) United States Patent
Bissell et al.

(10) Patent No.: US 11,680,739 B2
(45) Date of Patent: Jun. 20, 2023

(54) VAPOUR COMPRESSION APPARATUS

(71) Applicant: Sunamp Limited, Lothian (GB)

(72) Inventors: Andrew John Bissell, Lothian (GB); David Oliver, Lothian (GB); Andrew William McCahey, Lothian (GB); Maurizio Zaglio, Lothian (GB)

(73) Assignee: Sunamp Limited, Lothian (GB)

( * ) Notice: Subject to any disclaimer, the term of this patent is extended or adjusted under 35 U.S.C. 154(b) by 191 days.

(21) Appl. No.: 16/978,416

(22) PCT Filed: Mar. 11, 2019

(86) PCT No.: PCT/GB2019/050670
§ 371 (c)(1),
(2) Date: Sep. 4, 2020

(87) PCT Pub. No.: WO2019/171087
PCT Pub. Date: Sep. 12, 2019

(65) Prior Publication Data
US 2021/0041146 A1    Feb. 11, 2021

(30) Foreign Application Priority Data
Mar. 9, 2018   (GB) .................................... 1803841

(51) Int. Cl.
*F25B 49/02*   (2006.01)
*F25B 13/00*   (2006.01)
*F25B 41/24*   (2021.01)

(52) U.S. Cl.
CPC .............. *F25B 49/02* (2013.01); *F25B 13/00* (2013.01); *F25B 41/24* (2021.01);
(Continued)

(58) Field of Classification Search
CPC ...... F25B 49/02; F25B 2400/24; F25B 13/00; F25B 41/24; F25B 2600/2507; F25B 2700/2111
See application file for complete search history.

(56) References Cited

U.S. PATENT DOCUMENTS

| 4,395,886 A | 8/1983 | Mayer |
| 4,572,864 A | 2/1986 | Benson et al. |

(Continued)

FOREIGN PATENT DOCUMENTS

| GB | 2252327 A | 8/1992 |
| JP | S5541305 A | 3/1980 |

(Continued)

OTHER PUBLICATIONS

Gasia et al. "Phase Change Material Selection for Thermal Processes Working under Partial Load Operating Conditions in the Temperature Range between 120 and 200° C." Applied Sciences, 7(722): 1-14 (2017).

(Continued)

*Primary Examiner* — Henry T Crenshaw
(74) *Attorney, Agent, or Firm* — Myers Bigel, P.A.

(57) ABSTRACT

The present invention describes a vapour compression apparatus wherein an intermediary located heat battery is capable of releasing charge (i.e. discharging) and/or charging and thereby controlling the temperature of a heat source or heat sink temperature in a vapour compression cycle. More particularly, the present invention describes vapour compression apparatus wherein an intermediary located heat battery comprising Phase change material (PCM) is capable of releasing charge (i.e. discharging) energy and/or charging and thereby controlling the temperature of a heat source and/or heat sink temperature in a vapour compression cycle in a range of refrigeration and/or heating systems including: air conditioning in both domestic and industrial uses; trans- (Continued)

portation of food/materials in vehicles, trains, air, etc. The present invention also relates to a methodology for selecting phase change materials (PCMs) and/or refrigerants for a vapour compression apparatus.

20 Claims, 14 Drawing Sheets

(52) U.S. Cl.
CPC ... *F25B 2400/24* (2013.01); *F25B 2600/2507* (2013.01); *F25B 2700/2111* (2013.01)

(56) References Cited

U.S. PATENT DOCUMENTS

| | | | | |
|---|---|---|---|---|
| 5,052,191 | A * | 10/1991 | Shapiro-Baruch | F25B 47/025 62/238.7 |
| 5,165,250 | A * | 11/1992 | Nagatomo | F25B 13/00 62/158 |
| 2006/0032623 | A1* | 2/2006 | Tsubone | F28D 20/00 165/202 |
| 2014/0150475 | A1 | 6/2014 | Zaynulin et al. | |
| 2015/0191182 | A1* | 7/2015 | Abou Eid | F25B 47/022 62/335 |
| 2015/0292775 | A1 | 10/2015 | Ma et al. | |
| 2016/0123009 | A1 | 5/2016 | Ayambem | |
| 2019/0264933 | A1* | 8/2019 | Ignatiev | F25B 1/10 |

FOREIGN PATENT DOCUMENTS

| | | |
|---|---|---|
| JP | S61163984 A | 7/1986 |
| JP | S6387558 A | 4/1988 |
| JP | S63306376 A | 12/1988 |
| JP | S6438563 A | 2/1989 |
| JP | H01266470 A | 10/1989 |
| JP | H04277589 A | 10/1992 |
| JP | H0525467 A | 2/1993 |
| JP | H0743052 A | 2/1995 |
| JP | H1019409 A | 1/1998 |
| JP | H11108530 A | 4/1999 |
| JP | 2003222416 A | 8/2003 |
| JP | 2007017089 A | 1/2007 |
| JP | 2007277520 A | 10/2007 |
| JP | 2008025921 A | 2/2008 |
| JP | 2017166780 A | 9/2017 |
| WO | 2017221025 | 12/2017 |

OTHER PUBLICATIONS

International Preliminary Report on Patentability corresponding to international Patent Application No. PCT/GB2019/050670 (15 pages) (dated Feb. 12, 2020).

International Search Report and the Written Opinion of the International Searching Authority corresponding to International Patent Application No. PCT/GB2019/050670 (22 pages) (dated Oct. 29, 2019).

Xu et al. "Selection of Phase Change Material for Thermal Energy Storage in Solar Air Conditioning Systems" Energy Proceedia, 105:4281-4288 (2017).

* cited by examiner

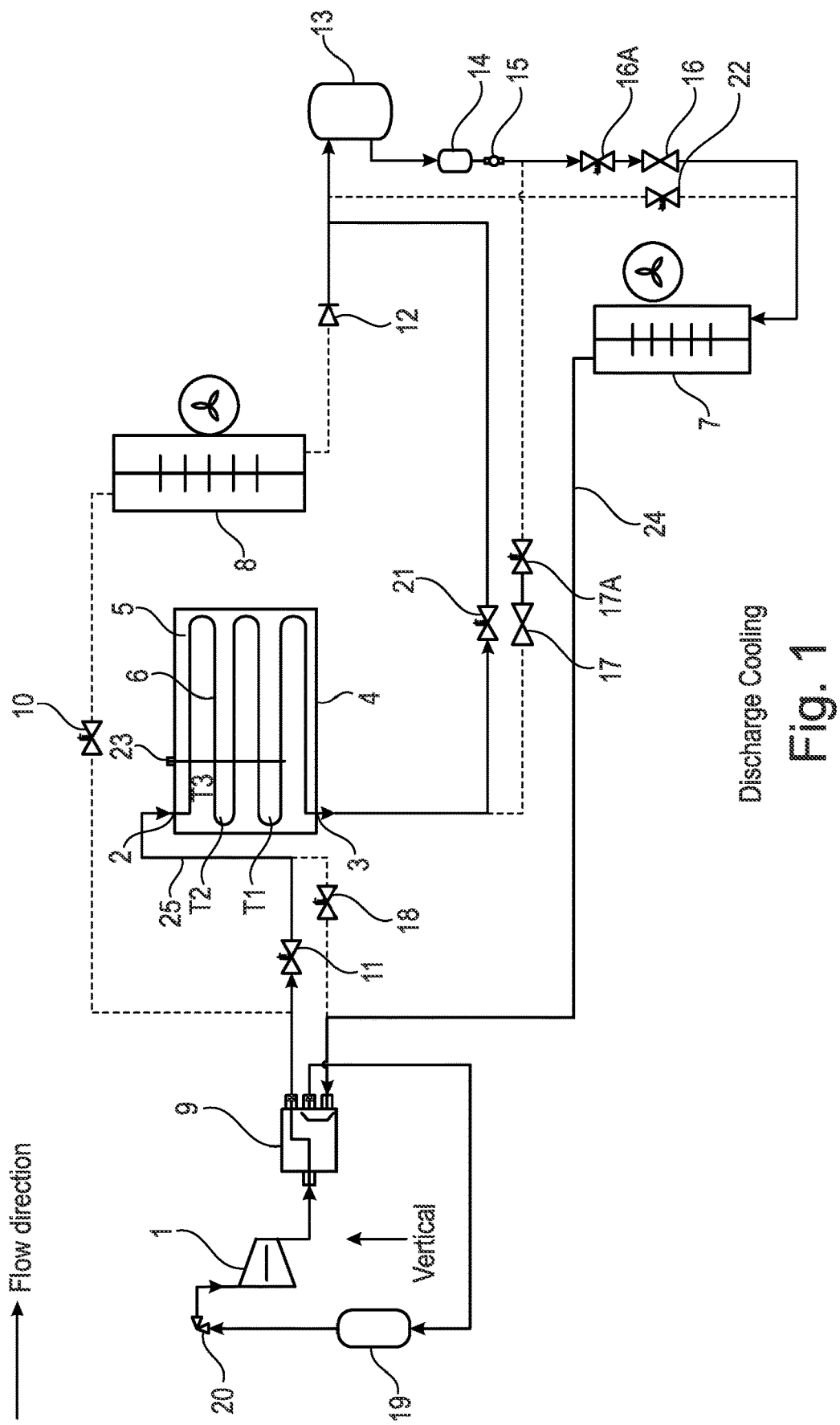

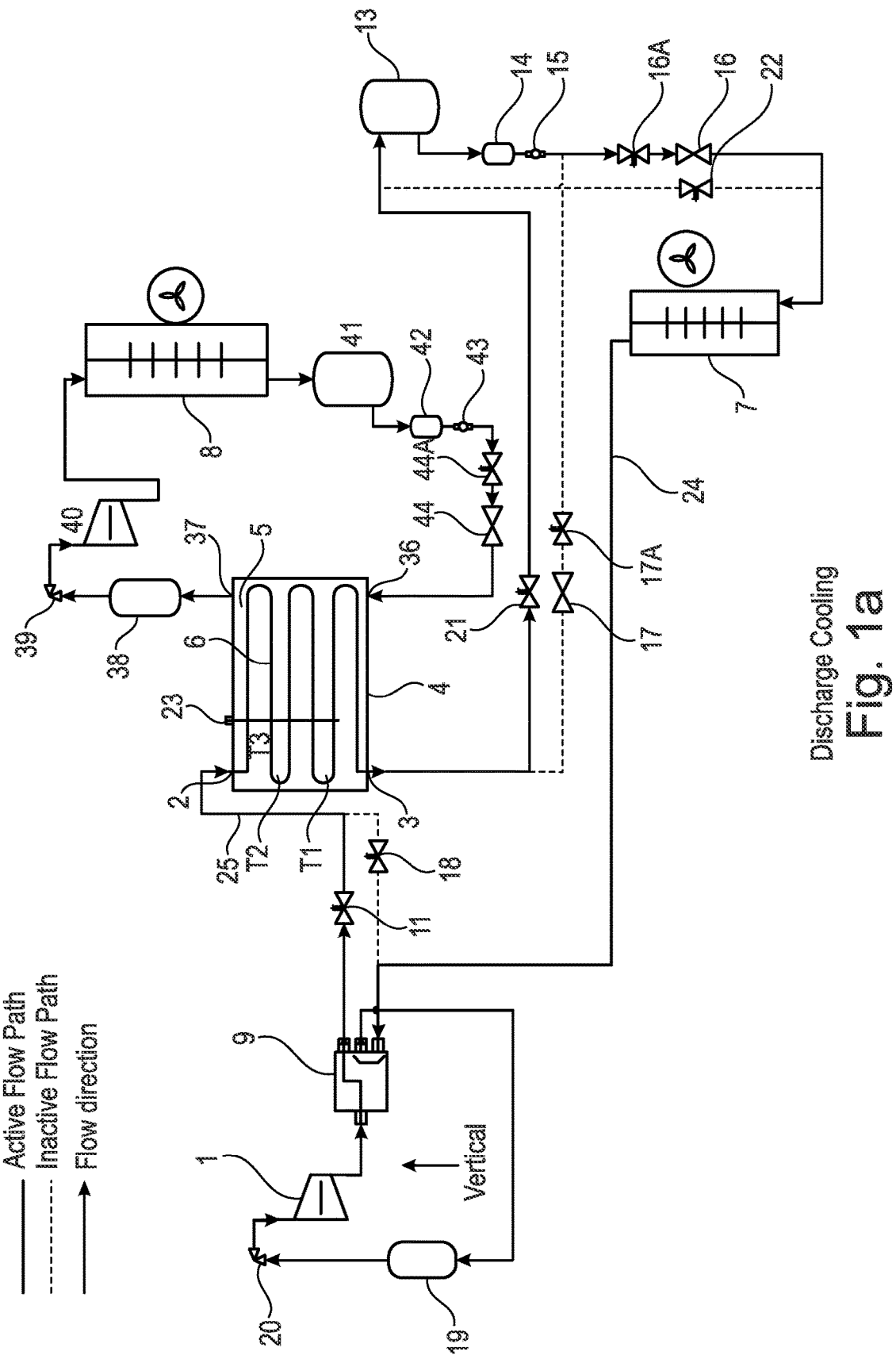

Pre-Cooling

Redundant Convention System

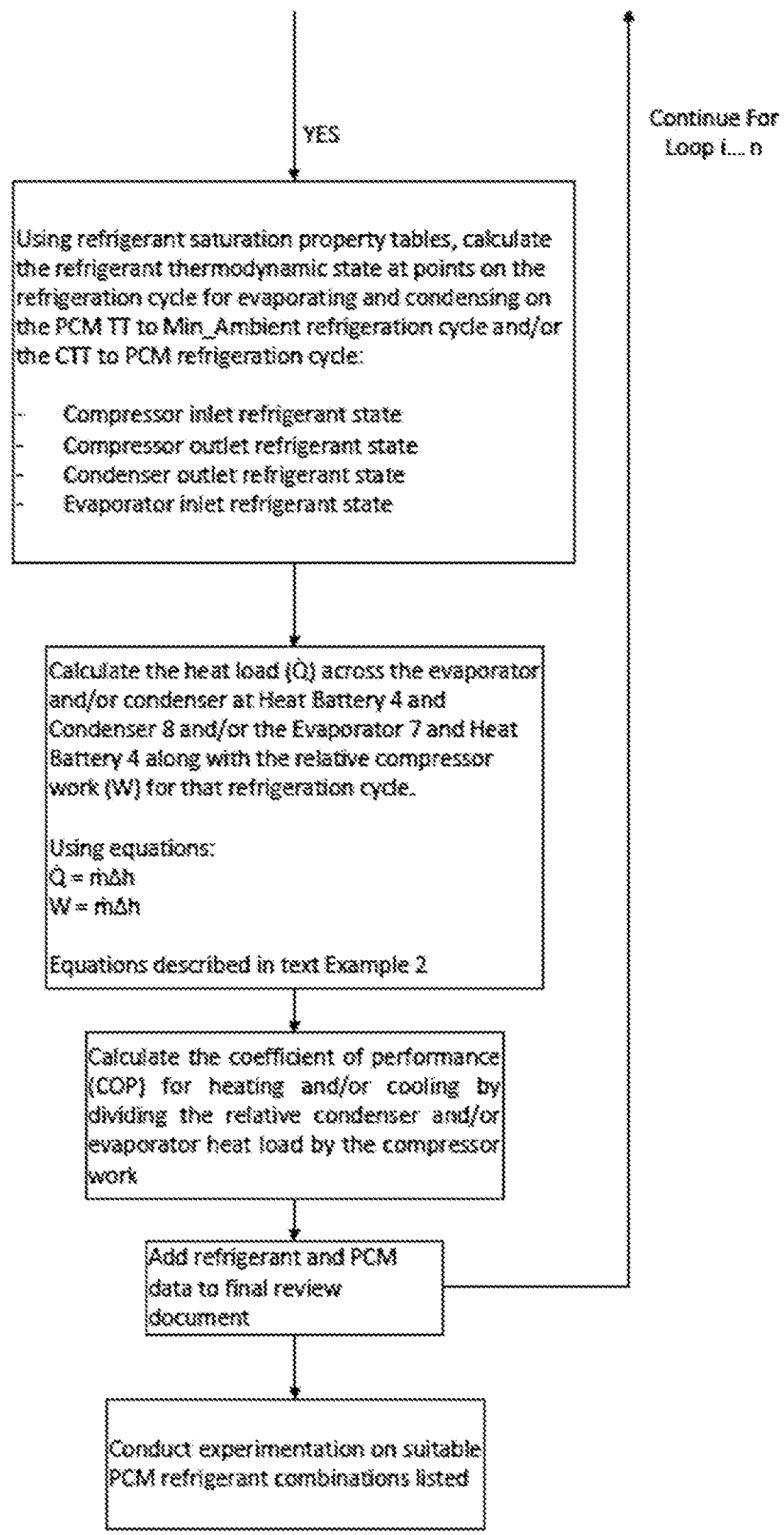
Fig. 12, cont.

VAPOUR COMPRESSION APPARATUS

FIELD OF THE INVENTION

The present invention relates to a vapour compression apparatus wherein an intermediary located heat battery is capable of releasing charge (i.e. discharging) and/or charging and thereby controlling the temperature of a heat source or heat sink temperature in a vapour compression cycle.

More particularly, the present invention relates to a vapour compression apparatus wherein a heat battery is located between an evaporator and a condenser and the vapour compression apparatus comprises a phase change material (PCM) which is capable of releasing charge (i.e. discharging) energy and/or charging and thereby controlling the temperature of a heat source and/or heat sink temperature in a vapour compression cycle in a range of refrigeration and/or heating systems including: air conditioning in both domestic and industrial uses; transportation of food/materials in vehicles, trains, air, etc. The present invention also relates to a methodology for selecting phase change materials (PCMs) and/or refrigerants for a vapour compression apparatus.

BACKGROUND OF THE INVENTION

There is a need in the art to provide improved temperature control in a range of systems including: air conditioning in both domestic and industrial uses; transportation of food/materials in vehicles, trains, air, etc.

Previous prior art systems have suffered from poor and inefficient temperature control and complex systems that have been found to be unreliable with regular breakdowns. In addition, prior art systems with their complex designs have been found to be extremely heavy which is not desired during transportation systems and also makes installation more difficult.

It is an object of at least one aspect of the present invention to obviate or at least mitigate one or more of the aforementioned problems.

It is a further object of at least one aspect of the present invention to provide an improved vapour compression apparatus.

SUMMARY OF THE INVENTION

According to a first aspect of the present invention there is provided vapour compression apparatus comprising:
  a pumping device used to pump a refrigerant;
  a condenser which is capable of condensing the refrigerant;
  an evaporator which is capable of evaporating the refrigerant,
  a heat battery comprising a phase change material (PCM);
  at least one or a series of temperature and/or pressure sensors capable of monitoring the temperature and/or pressure of the phase change material (PCM) in the heat battery;
  wherein the heat battery is capable of being connected to the condenser and/or evaporator to release charge (i.e. discharging) energy and/or be charged whereby the heat battery is capable of controlling the temperature of a heat source and/or heat sink temperature in a vapour compression cycle.

The present invention therefore relates to a vapour compression apparatus wherein an intermediary located heat battery between an evaporator and heat condenser is capable of releasing charge (i.e. discharging) and/or charging and thereby controlling the temperature of a heat source or heat sink temperature in a vapour compression cycle. This provides a highly energy efficient system which is an improvement over any known prior art systems.

The invention may therefore relate to a temperature and/or pressure controlled vapour compression apparatus.

Any suitable type of refrigerant may be used. The temperature and/or pressure of the refrigerant may also be measured and/or monitored along with the direction of flow of the refrigerant.

The apparatus of the present invention may therefore provide a highly effective way in which the flow of the refrigerant around the apparatus may be controlled to provide maximum efficiency.

The physical state and/or conditions of the heat battery may be closely monitored via, for example, real-time temperature and/or pressure measurements being made on the phase change material (PCM). Alternatively, the temperature and/or pressure measurements may be conducted constantly and/or continuously, intermittently or periodically such as every 30 seconds or every minute. A control management system may perform this role.

The pumping device may in preferred embodiments be any suitable type of compressor. For, example, known refrigeration compressors may be used.

The vapour compression apparatus therefore has at least one or a series of temperature and/or pressure sensors which are capable of monitoring and controlling the temperature and/or pressure of the phase change material (PCM) in the heat battery.

The temperature and/or pressure sensors may be located on any part or be an integral part of the heat battery such as on any surface of the heat battery e.g. an upper surface of the battery.

The at least one or a series of temperature and/or pressure sensors may be immersed in the phase change material (PCM) to provide a range of temperature and/or pressure measurements. Using these measurements the physical state and/or conditions of the phase change material (PCM) may be monitored and/or controlled. For example, a series of temperature and/or pressure measurements may be made to maximise the efficiency of the whole vapour compression apparatus.

It has been found that by taking temperature and/or pressure measurements and sensing the temperature and/or pressure provides an accurate monitor of the charge being held by the phase change material (PCM). This allows for complete real-time control in the apparatus according to the present invention.

The present invention may therefore provide an accurate real-time measurement of the state and physical conditions of the heat battery including the charge held by the heat battery.

The measurement of the temperature and/or pressure may be conducted using any suitable temperature and pressure measurement devices known in the art. This allows real-time temperature and/or pressure measurements to be made of the phase change material (PCM) located within the heat battery. This has the specific technical advantage of being able to monitor and/or measure the pressure and/or temperature in the heat battery. This allows the complete system to be controlled in a very efficient manner and the system to be completely controllable.

Switching of the refrigerant flow may also be effected and very accurately controlled with the temperature and/or pressure measurements to provide a highly efficient system.

In a preferred embodiment of the present invention the evaporator may be located vertically below or substantially vertically below the condenser.

The heat battery may be intermediary located between the condenser and the evaporator. The present invention therefore provides an intermediary stage between a heat source and/or heat sink and a temperature-controlled environment. The heat battery comprising the phase change material (PCM) may therefore function as an intermediary located heat exchanger in the apparatus. The heat battery may therefore be capable of releasing charge (i.e. discharging) and/or charging and thereby controlling the temperature of a heat source or heat sink temperature in a vapour compression cycle apparatus.

The apparatus of the present invention may therefore have the added functionality of being time independent between a first stage and a second stage of heat exchange. The time independence comes from use of the phase change material (PCM) as the energy can be released at any time. The first stage may be referred to as pre-cooling or pre-heating, and the second stage may be referred to as discharge cooling or discharge heating.

There may be a series and/or network of pipes connecting all of the different components such as the pumping device (e.g. compressor), the condenser, the evaporator, the heat battery in the apparatus which are controlled via, for example, valves such as expansion valves, shut-off valves etc. This is discussed below in more detail.

The phase change material (PCM) may function as a medium for heat transfer to, for example, a refrigerant heat exchanger i.e. the evaporator and/or condenser.

The apparatus may be located in a substantially vertical orientation wherein a liquid containing vessel may be located preferentially above the compressor. Typically, the liquid containing vessel may be located vertically or substantially vertically between the evaporator and the condenser.

The liquid receiving vessel may be located downstream of the condenser and may be sized to contain a buffer of liquid refrigerant. The liquid receiving vessel may therefore function as a receptacle for acting as a reservoir for some of the liquid refrigerant.

The compressor may be used to compress and/or pressurise refrigerant material around a system and/or network of pipes around the apparatus.

In the situation where the apparatus is being used for discharge pre-cooling or pre-heating the flow of refrigerant occurs from the top to the bottom of the vertically or substantially vertically oriented apparatus. This may be considered as a first stage of cooling/heating in the present invention.

In the situation where the apparatus is being used for pre-cooling or discharge heating the flow of refrigerant occurs from the bottom to the top in the vertically or substantially vertically oriented apparatus.

The refrigerant flow in the apparatus may be reversed without any loss of functionality.

Any suitable type of phase change material (PCM) may be used including any one of or combination of the following:
- a paraffin material, such as decane e.g. forming a PCM with a phase change transition temperature of about 25° C. to 35° C. or about −30° C., with optionally additives to improve nucleation, crystallisation rates and/or cyclability;
- a salt-water eutectic, such as sodium chloride and water e.g. forming a PCM with a phase change transition temperature of about 20° C. to 25° C. or about −22° C., with optionally additives to improve nucleation, crystallisation rates and/or cyclability;
- a salt-water eutectic, such as magnesium sulfate and water e.g. forming a PCM with a phase change transition temperature of about −10° C. to 0° C. or about −5° C., with optionally additives to improve nucleation, crystallisation rates and/or cyclability;
- a salt-water eutectic, such as sodium sulfate and water e.g. forming a PCM with a phase change transition temperature of about −5° C. to +5° C. or about −1° C., with optionally additives to improve nucleation, crystallisation rates and/or cyclability;
- an organic ester, such as methyl laurate e.g. forming a PCM with a phase change transition temperature of about 0° C. to 10° C. or about 5° C., with optionally additives to improve nucleation, crystallisation rates and/or cyclability;
- a clathrate hydrate, such as tetrahydrafuran (THF) and water e.g. forming a PCM with a phase change transition temperature of about 0° C. to 10° C. or about 5° C., with optionally additives to improve nucleation, crystallisation rates and/or cyclability;
- an ester such as dimethyl succinate e.g. forming a PCM with a phase change transition temperature of about 15° C. to 25° C. or about 18° C., with optionally additives to improve nucleation, crystallisation rates and/or cyclability;
- a fatty alcohol, such as dodecanol e.g. forming a PCM with a phase change transition temperature of about 15° C. to 25° C. or about 22° C., with optionally additives to improve nucleation, crystallisation rates and/or cyclability;
- a salt hydrate, such as sodium sulfate decahydrate e.g. forming a PCM with a phase change transition temperature of about 25° C. to 35° C. or about 32° C., with optionally additives to improve nucleation, crystallisation rates and/or cyclability;
- a salt hydrate, such as sodium acetate trihydrate e.g. forming a PCM with a phase change transition temperature of about 0° C. to 10° C. about 5° C., with optionally additives to improve nucleation, crystallisation rates and/or cyclability;
- a polyol with a solid-solid phase change, such as trimethyloethane e.g. forming a PCM with a phase change transition temperature of about 70° C. to 95° C. or about 81° C., with optionally additives to improve nucleation, crystallisation rates and/or cyclability; and
- a polyol, such as erythritol e.g. forming a PCM with a phase change transition temperature of about 100° C. to 150° C. about 121° C., with optionally additives to improve nucleation, crystallisation rates and/or cyclability.

The phase change material (PCM) may be selected which has a phase change temperature of about 1° C.-20° C. or preferably about 10° C.-15° C. above the temperature that we require to cool to (e.g. lowest temperature) and/or the phase change temperature that causes a refrigerant to condense with a pressure 1-10 BarG or preferably about 1-5 BarG above the pressure of the required evaporation pressure. Moreover, the phase change material (PCM) may be selected which has a phase change temperature of about 1° C.-20° C. or preferably about 10° C.-15° C. above the temperature (e.g. minimum temperature) of the ambient condition in which the heat pump is sourcing it's heat energy and/or the phase change temperature that causes a refrigerant to evaporate with a pressure of about 1-10 BarG or preferably about 1-5 BarG above the pressure refrigerant would evaporate at, for example, given the design conditions minimum ambient temperature.

The refrigerant may be selected from any one or more of the following: hydrofluorocarbons; and hydrocarbons.

Typical refrigerant hydrocarbons include any one or more of the following: isobutane and propane.

Other suitable refrigerants include carbon dioxide and ammonia.

Suitable refrigerants for the present invention are shown below which may be used on their own or in any combination:

| Refrigerant Toxicity - ISO 817 Classification | | |
|---|---|---|
| A3 | B3 | Higher Flammability |
| A2 | B2 | Flammable |
| A2L | B2L | Lower Flammability |
| A1 | B1 | Non-Flammable |
| Lower Toxicity | Higher Toxicity | |

Refrigerants with lower toxicity and which are non-flammable our preferred.

The evaporator may be a fan coil evaporator. The evaporator may be located below or substantially below the condenser. The evaporator in the situation where it is to be used for cooling may be used for cooling a space that is designated for cooling. Alternatively, the evaporator may be used to heat from a space that is designated for heating.

Located above the evaporator there may be the condenser which may, for example, be a fan coil condenser. The condenser may be used in ambient conditions where heat is rejected. Alternatively, the condenser may be used to heat a space that is designated for heating. This provides a flow of refrigerant from top to bottom in the apparatus. The direction of flow can however be reversed.

The functionality of the evaporator and condenser may therefore be reversed and replaced by one another during different cycles.

Moreover, the evaporator and condenser may be replaced by other heat exchangers known in the art e.g. plate heat exchangers. The apparatus of the present invention is therefore highly adaptable for different situations.

The apparatus may comprise a reversing valve to reverse the flow of refrigerant. In a particular embodiment, a four-port reversing valve may be used.

| | Refrigerant | GWP | Class | P_Vap (BarA) at −20° C. | P_Liq (BarA) at 0° C. | P_Liq (BarA) at +60° C. | Applications |
|---|---|---|---|---|---|---|---|
| Hydrofluoro-carbons | R404A | 3922 | A1 | 3.00 | 6.10 | 28.85 | Frozen food |
| | R452A | 2140 | A1 | 2.62 | 6.09 | 28.73 | refrigeration; |
| | R407F | 1824 | A1 | 2.46 | 6.29 | 30.35 | Process |
| | R449A | 1397 | A1 | 2.25 | 5.72 | 27.54 | chilling |
| | R454A | 238 | A2L | 2.17 | 5.36 | 25.71 | |
| | R454C | 146 | A2L | 1.90 | 4.55 | 22.24 | |
| | R134a | 1430 | A1 | 1.33 | 2.93 | 16.82 | Supermarket |
| | R513A | 631 | A1 | 1.42 | 3.06 | 16.61 | refrigeration |
| | R1234ze | 6 | A2L | 0.97 | 2.17 | 12.77 | systems; Process |
| | R1234yf | 4 | A2L | 1.51 | 3.16 | 16.42 | chilling Domestic refrigeration; Residential A/C Mobile Air Conditioning; |
| | R410A | 2088 | A1 | 3.99 | 8.01 | 38.42 | Medical freezers; |
| | R32 | 675 | A2L | 4.06 | 8.13 | 39.33 | LNG liquification; |
| | R452B | 676 | A2L | 3.09 | 7.20 | 34.30 | Residential A/C |
| Hydrocarbons | IsoButane | 3 | A3 | 0.72 | 1.57 | 8.69 | Vending machines; |
| | propane | 3 | A3 | 2.45 | 4.74 | 21.17 | Transport refrigeration |
| | carbon dioxide | 1 | A1 | 19.70 | 34.85 | Supercritical past 31.1° C. | (CO2); Industrial |
| | ammonia | 0 | B2L | 1.90 | 4.29 | 26.16 | Refrigeration (Ammonia) |

The refrigerants listed above may be selected and chosen for different temperature ranges.

Located within the heat battery there may be a series of tubes. The tubes may comprise fins, insulation, and an outer case. Any suitable type and orientation of tubes may be used to help distribute the energy from/to the phase change material (PCM).

Located on an outer (e.g. the upper surface) of the heat battery there may optionally be temperature and/or pressure sensors, for example, providing temperature and/or pressure measurements. The temperature and/or pressure sensors may be immersed in the phase change material (PCM) in the heat battery.

It should be noted that it has been found in the present invention that the refrigerant pressure and/or temperature of the phase change material (PCM) can indicate the state and physical conditions of the heat battery. The charge held by the phase change material (PCM) may also be measured and/or monitored using the temperature and/or pressure measurements.

Reversing valve and solenoid valves, to switch between charging and/or discharging and hot gas defrosting of heat exchangers may also be incorporated into the apparatus.

The switching may occur manually or electronically and be dependent on the temperature and/or pressure being measured and when switching is required. For example, when heating is required refrigerant may flow from the heat battery and when cooling is required refrigerant may flow into the heat battery. As required switching of the flow may be effected to maximise the efficiency of the apparatus.

The apparatus may also comprise of an expansion valve which may be connected to the evaporator when it is functioning as the acting evaporator. The expansion valve may be an electronic or thermostatic valve.

There may be a further valve which can also be used as a shut-off valve. The shut-off valve may be an electronic or manual shut-off valve. The shut-off valve may be connected to the reversing valve and the heat battery.

Connected to the condenser there may be a further valve which, for example, functions as a check valve. The check valve may also be connected to the liquid containing vessel.

In a preferred embodiment, the liquid containing vessel may be located above the compressor and below the condenser.

The apparatus may also comprise a dryer such as a filter dryer which is optionally located preferably vertically below the liquid containing vessel.

The apparatus may also optionally comprise a window for viewing such as a sight glass.

The apparatus may also comprise expansion devices (e.g. expansion valves) which can be used for pre-cooling. In the event that the expansion valve is electronic then additional solenoids are not required.

Typically, the apparatus may also comprise at least one solenoid valve located between the heat battery and the reversing valve. The solenoid valve may be used to isolate the heat battery when required.

The solenoid valves may be used interchangeably with any controllable zone valve.

The apparatus may also comprise a suction line accumulator which can be used to expand refrigerant and ensure gas only return to the compressor.

The apparatus may also comprise a crank-case pressure regulator. The crank-case pressure regulator may preferably operate at, for example, about 2 Bar with a refrigerant such as R449A. However, any other suitable type of refrigerant may be used.

There may also be a further solenoid valve connected to the heat battery and the liquid containing vessel.

Additionally, there may be a solenoid valve which may be used for hot gas defrosting.

In alternative embodiments the apparatus may also comprise an integrated capillary tube.

In further embodiments the apparatus may also comprise an integrated liquid receiver and a capillary tube.

The apparatus may also comprise an integrated microchannel heat exchanger used for condensing refrigerant and charging a heat battery. Refrigerant superheated gas may enter the microchannel heat exchanger at an inlet port, condense along channels and exit as a liquid at an exit port.

A specific aspect and advantage of the present invention is that the same apparatus may be used to both heat and cool with the cycles being reversible. This means that an apparatus may be provided which may use the same compressor and refrigeration to both charge and cool thereby reducing the cost of such systems to an end user.

On the discharge cycle the apparatus will be required to transfer heat energy between the intermediate heat exchanger (i.e. the heat battery) and the temperature-controlled environment.

The apparatus operates via a refrigerant flow driven by a pressure differential across the pumping device (e.g. the compressor). It is this pressure differential that transfers heat across the apparatus. This pressure differential is dependent on the temperature the refrigerant is forced to evaporate at an evaporator coil in the evaporator and the temperature it is forced to condense at a condensing coil in the condenser.

According to a second aspect of the present invention there is provided a vapour compression apparatus comprising:
  a pumping device which is used to pump a refrigerant;
  a condenser which is capable of condensing the refrigerant;
  an evaporator which is capable of evaporating the refrigerant;
  a heat battery comprising a phase change material (PCM);
  wherein the heat battery is capable of being connected to the condenser and/or evaporator to release charge (i.e. discharging) energy and/or be charged whereby the heat battery is capable of controlling the temperature of a heat source and/or heat sink temperature in a vapour compression cycle.

The apparatus according to the second aspect may comprise any of the features as defined for the first aspect and in any combination.

According to a third aspect of the present invention there is provided a method for controlling the temperature of a heat source and/or heat sink temperature in a vapour compression cycle using apparatus according to any of the first and second aspects.

The method may comprise providing:
  a pumping device which is used to pump a refrigerant;
  a condenser which is capable of condensing the refrigerant;
  an evaporator which is capable of evaporating the refrigerant;
  a heat battery comprising a phase change material (PCM);
  at least one or a series of temperature and/or pressure sensors capable of monitoring the temperature and/or pressure of the phase change material (PCM) in the heat battery;
  wherein the heat battery is capable of being connected to the condenser and/or evaporator to release charge (i.e. discharging) energy and/or be charged whereby the heat battery is capable of controlling the temperature of a heat source and/or heat sink temperature in a vapour compression cycle.

According to a fourth aspect of the present invention there is provided a methodology for selecting phase change materials (PCMs) and/or refrigerants for a vapour compression apparatus comprising:
  Choose lowest Global Warming Potential (GWP) and legally allowed refrigerants and choose a Candidate Refrigerant
  Review the refrigerant pressure range of the selected Candidate Refrigerant
  Review where the Candidate Refrigerant evaporates and condenses relative to Compartment Target Temperature (CTT) and minimum ambient temperature (Min_Ambient)
  For a list of phase change materials (PCMs) with Transition Temperatures (TT) in the range CTT to Min_Ambient, evaluate for each the refrigerant pressure that arises at the Transition Temperature
  Clip the list to remove all candidates that have insufficient pressure differential to drive refrigerant flow between evaporating and condensing on the PCM TT to Min_Ambient refrigeration cycle and/or the CTT to PCM refrigeration cycle
  Using refrigerant saturation property tables, calculate the refrigerant thermodynamic state at a plurality of points (e.g. 2-10, or preferably 4 points) on the refrigeration cycle for evaporating and condensing on the PCM TT to Min_Ambient refrigeration cycle and/or the CTT to PCM refrigeration cycle:
  Compressor inlet refrigerant state
  Compressor outlet refrigerant state
  Condenser outlet refrigerant state
  Evaporator inlet refrigerant state
  Calculate the heat load (kW) across the evaporator and/or condenser and compressor work (kW) for each refrigeration cycle.
  Using this information the coefficient of performance (COP) for heating and/or cooling can be determined for each pairing of refrigerant and PCM.

Using the above methodology, any suitable phase change material (PCM) and/or refrigerant may be used as previously discussed on this application in any of the previous aspects.

Moreover, any suitable number of points may be analysed during the calculation of the refrigerant thermodynamic state.

BRIEF DESCRIPTION OF THE FIGURES

The invention will now be described, by way of example only, with reference to the following Figures in which:

FIG. 1 is a representation of a vapour compression apparatus according to an embodiment of the present invention in a discharge cooling phase;

DETAILED DESCRIPTION

Figure 2:
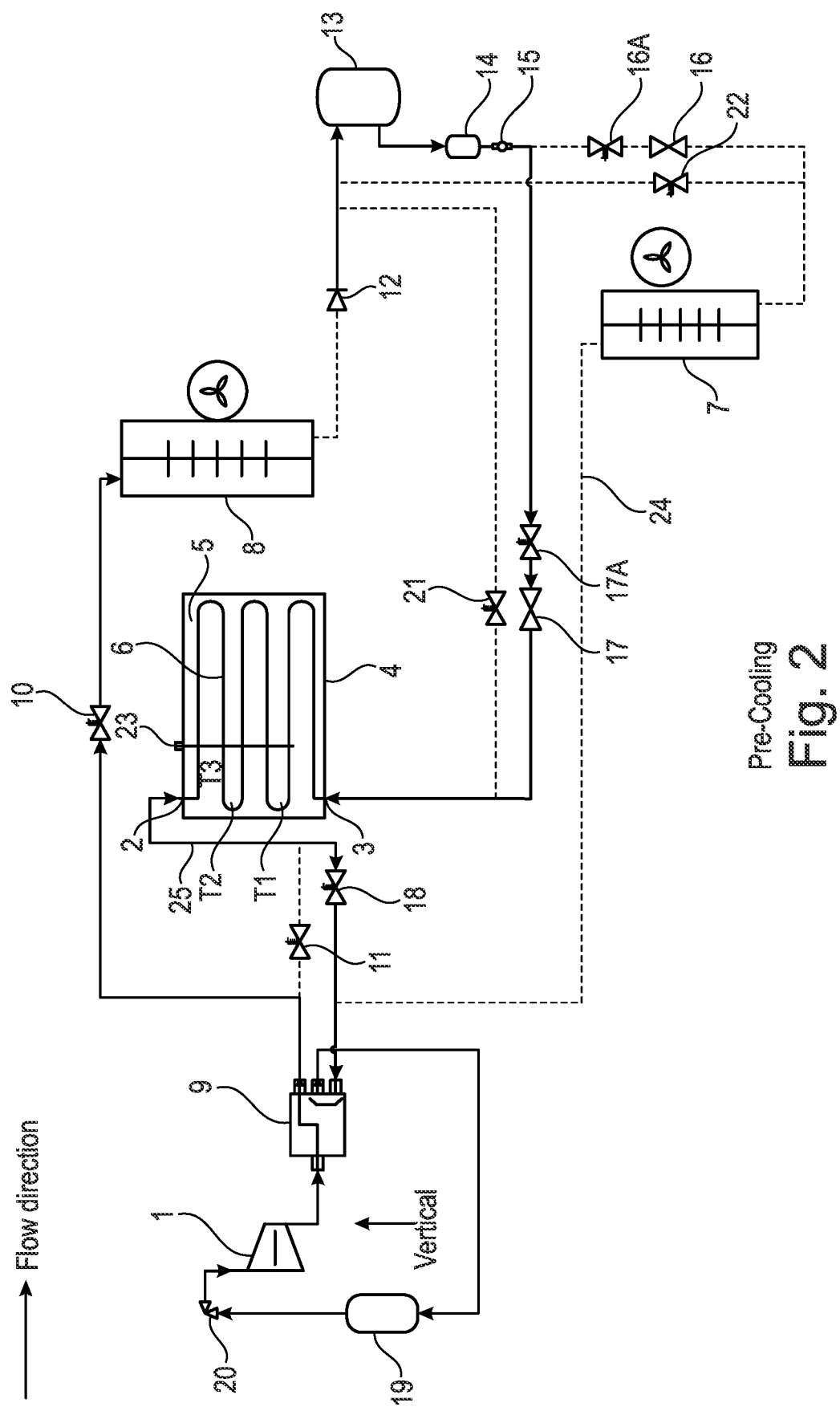
FIG. 2 is a representation the apparatus shown in FIG. 1 according to an embodiment of the present invention in a pre-cooling phase.

The present invention relates to a vapour compression apparatus wherein an intermediary located heat battery is capable of releasing charge (i.e. discharging) and/or charging and thereby controlling the temperature of a heat source or heat sink temperature in a vapour compression cycle. At least one or a series of temperature and/or pressure sensors may monitor in a real-time manner the temperature and/or pressure of the phase change material (PCM) in the heat battery allowing the heat battery to be controlled and provide a highly efficient system for the vapour compression apparatus.

In the present invention, phase change material (PCM) is used in an intermediary located heat battery which is located between the condenser and evaporator. The phase change material (PCM) acts as a medium for heat transfer to, for example, a refrigerant heat exchanger i.e. the evaporator and/or condenser. Phase change material (PCM) is an alternative heat exchange medium in the form of energy storage.

The phase change material (PCM) may be used to form a heat battery as described below.

The purpose of the intermediary located heat battery in the apparatus of the present invention is to provide an intermediary stage between a heat source and/or heat sink and a temperature-controlled environment. In effect, of the apparatus of the present invention has the added functionality of being time independent between a first stage and a second stage of heat exchange. The time independence comes from use of the phase change material (PCM) as the energy can be released at any time. The first stage may be referred to as pre-cooling or pre-heating, and the second stage may be referred to as discharge cooling or discharge heating.

FIG. 1 is a representation of a vapour compression apparatus according to the present invention. In FIG. 1, the apparatus is used in a discharge cooling phase where refrigerant material can be seen passing from the heat battery 4 to the liquid containing vessel 13 and down to the evaporator 7.

In FIG. 1 the vapour compression apparatus is shown in a vertical or substantially vertical orientation wherein a liquid containing vessel 13 is located preferentially above a compressor 1. Moreover, an evaporator 7 is located below a condenser 8.

The liquid receiving vessel 13 is located downstream of the condenser 8 and is sized to contain a buffer of liquid refrigerant. The liquid receiving vessel 13 therefore functions as a receptacle for acting as a reservoir for some of the liquid refrigerant. From the liquid receiving vessel 13 to the inlet of the expansion valve is called the liquid line, and will be designed to encourage the proper supply of liquid refrigerant, and as a result promote controllable refrigerant mass flow.

The apparatus is orientated in such a way as to best avail of the thermosyphon effect where the density differences of refrigerant in a liquid or gaseous state tend to result in a gaseous refrigerant to be more buoyant. This effect is optimised by making the most effective vertical or substantially vertical flow path between components and/or the flow path in the components shown in FIG. 1.

The compressor discharge line rises slightly up to the condenser 8 or the heat battery 4 carrying superheated refrigerant gas. Then, the liquid line flows downwards or substantially downwards towards the liquid receiving vessel 13 carrying subcooled condensed liquid refrigerant.

The path from the liquid receiving vessel 13 to expansion valve 16 or 17 is downwards or substantially downwards preferably carrying sub-cooled condensed liquid refrigerant. The refrigerant undergoes a pressure drop across the expansion valve orifice, and the general flow path is vertically upwards or substantially upwards to an outlet of the evaporator 7.

The flow path from the evaporator 7 to the compressor 8 is a design choice for that specific application. There are two points to consider:
 1) Orientate the flow path slightly downwards to facilitate the compressor oil circulation return to the compressor 8, because the refrigerant is less dense to carry oil droplets.
 2) Orientate the flow path slightly upwards to benefit from the natural tendency of the refrigerant to rise as it becomes less dense.

The apparatus is therefore oriented in such a way as to best facilitate the compressor oil circulation around the system, see above point (1). It has therefore been found that it is best to have a vertical or substantially vertical orientation for the apparatus which is shown in FIG. 1.

The apparatus pipeline sizing and flow path has been selected in such a way facilitate compressor oil circulation around the apparatus. The pipe diameters have been chosen to optimise the velocity of the refrigerant flow and minimise the pressure drop experienced by the refrigerant flow. For example, the refrigerant should be flowing at a gas velocity of about 1 m/s-5 m/s or preferably about 2.5 m/s.

From the liquid receiving vessel 13 to the inlet of the expansion valve 16,17 is called the liquid line, and is designed to encourage the proper supply of liquid refrigerant to the inlet, and as a result promote controllable refrigerant mass flow.

Below we describe the vapour compression apparatus in detail. It should also be noted that the solid lines between the different components in FIG. 1 represents the active flow path. In addition, the dashed line represents the inactive flow path. The flow direction of refrigerant (i.e. energy) is represented by arrows.

The vapour compression apparatus comprises a compressor 1. The compressor 1 can be any suitable type of compressor or alternatively any type of pumping apparatus. However, as indicated above, in preferred embodiments the liquid containing vessel 13 is located above the compressor 1. By locating the liquid containing vessel 13 above the compressor 1 provides the advantage of greater efficiency in the active flow path.

In the situation where the apparatus is being used for discharge pre-cooling or pre-heating the flow of refrigerant occurs from the top to the bottom as shown by arrow 2 in the apparatus shown in FIG. 1. This may be considered as a first stage of cooling/heating in the present invention.

In the situation where the apparatus is being used for pre-cooling or discharge heating the flow of refrigerant occurs from the bottom to the top in the apparatus shown in FIG. 1. This is shown by arrow 3 in the apparatus.

The flow shown by arrows 2, 3 can be reversed without loss of functionality in the apparatus. However, the preferred direction as shown in FIG. 1 is shown by arrows 2, 3.

There is a heat battery 4 which is used to contain a phase change material (PCM) 5. Any suitable type of phase change material (PCM) 5 may be chosen such as:
- a paraffin material, such as decane e.g. forming a PCM with a phase change transition temperature of about −25° C. to −35° C. or about −30° C., with optionally additives to improve nucleation, crystallisation rates and/or cyclability;
- a salt-water eutectic, such as sodium chloride and water e.g. forming a PCM with a phase change transition temperature of about −20° C. to −25° C. or about −22° C., with optionally additives to improve nucleation, crystallisation rates and/or cyclability;
- a salt-water eutectic, such as magnesium sulfate and water e.g. forming a PCM with a phase change transition temperature of about −10° C. to 0° C. or about −5° C., with optionally additives to improve nucleation, crystallisation rates and/or cyclability;
- a salt-water eutectic, such as sodium sulfate and water e.g. forming a PCM with a phase change transition temperature of about −5° C. to +5° C. or about −1° C., with optionally additives to improve nucleation, crystallisation rates and/or cyclability;
- an organic ester, such as methyl laurate e.g. forming a PCM with a phase change transition temperature of about 0° C. to 10° C. or about 5° C., with optionally additives to improve nucleation, crystallisation rates and/or cyclability;
- a clathrate hydrate, such as tetrahydrafuran (THF) and water e.g. forming a PCM with a phase change transition temperature of about 0° C. to 10° C. or about 5° C., with optionally additives to improve nucleation, crystallisation rates and/or cyclability;
- an ester such as dimethyl succinate e.g. forming a PCM with a phase change transition temperature of about 15° C. to 25° C. or about 18° C., with optionally additives to improve nucleation, crystallisation rates and/or cyclability;
- a fatty alcohol, such as dodecanol e.g. forming a PCM with a phase change transition temperature of about 15° C. to 25° C. or about 22° C., with optionally additives to improve nucleation, crystallisation rates and/or cyclability;
- a salt hydrate, such as sodium sulfate decahydrate e.g. forming a PCM with a phase change transition temperature of about 25° C. to 35° C. or about 32° C., with optionally additives to improve nucleation, crystallisation rates and/or cyclability;
- a salt hydrate, such as sodium acetate trihydrate e.g. forming a PCM with a phase change transition temperature of about 0° C. to 10° C. about 5° C., with optionally additives to improve nucleation, crystallisation rates and/or cyclability;
- a polyol with a solid-solid phase change, such as trimethyloethane e.g. forming a PCM with a phase change transition temperature of about 70° C. to 95° C. or about 81° C., with optionally additives to improve nucleation, crystallisation rates and/or cyclability; and
- a polyol, such as erythritol e.g. forming a PCM with a phase change transition temperature of about 100° C. to 150° C. about 121° C., with optionally additives to improve nucleation, crystallisation rates and/or cyclability.

The phase change material (PCM) is selected which has a phase change temperature of about 1° C.-20° C. or preferably about 10° C.-15° C. above the temperature that we require to cool to (e.g. lowest temperature) and/or the phase change temperature that causes a refrigerant to condense with a pressure 1-10 BarG or preferably about 1-5 BarG above the pressure of the required evaporation pressure. Moreover, the phase change material (PCM) is selected which has a phase change temperature of about 1° C.-20° C. or preferably about 10° C.-15° C. above the temperature (e.g. minimum temperature) of the ambient condition in which the heat pump is sourcing it's heat energy and/or the phase change temperature that causes a refrigerant to evaporate with a pressure of about 1-10 BarG or preferably about 1-5 BarG above the pressure refrigerant would evaporate at given the design conditions minimum ambient temperature.

For different uses and applications, a specific phase change material (PCM) may therefore be chosen from a library of known phase change material (PCMs). The system and apparatus proposed in the present invention is therefore highly adaptable for a range of conditions and environments where a wide range of climates, temperatures and humidity may be encountered. This provides the advantage that the same apparatus may be sold throughout the world with merely the phase change material (PCM) being adapted and changed to suit the local environment. The apparatus proposed in the present invention is therefore a highly commercial and attractive approach for reducing the manufacturing costs of vapour compression apparatus.

Located within the heat battery 4 there is a series of tubes 6. The tubes may comprise fins, insulation, and an outer case (which are not shown). Any suitable type and orientation of tubes 6 may be used to help distribute the energy of the phase change material (PCM).

As shown in FIG. 1, located on an upper surface of the heat battery 4 there may optionally be temperature and/or pressure sensors 23, for example, providing temperature measurements T1, T2 and T3 and pressure measurements. The temperature and/or pressure sensors may be immersed in the phase change material (PCM) 5 in the heat battery 4.

It should be noted that it has been found in the present invention that the refrigerant pressure and/or temperature of the phase change material (PCM) can indicate the state and physical conditions of the heat battery 4 including the charge held by the phase change material (PCM) 5. For example, it has been found that when in a cold state the pressure is found to be low e.g. for a temperature of −10° C., using material known in the art R449A, this provides a pressure of 3.6 Bar; for a temperature of +60° C., using material known in the art R449A, this provides a pressure of 27.06 Bar.

The heat battery 4 comprising the phase change material (PCM) 5 may therefore function as an intermediary located heat exchanger in the apparatus. The heat battery 4 is therefore capable of releasing charge (i.e. discharging) and/or charging and thereby controlling the temperature of a heat source or heat sink temperature in a vapour compression cycle apparatus. No such control device exists in the prior art.

FIG. 1 also shows that there is an evaporator 7 (e.g. a fan coil evaporator). The evaporator 7 is located below the condenser 8. The evaporator 7 in the situation where it is to be used for cooling can be used for cooling a space that is designated for cooling. Alternatively, the evaporator 7 may be used to heat from a space that is designated for heating.

Located above the evaporator 7 is the condenser 8 (e.g. a fan coil condenser). The condenser 8 can be used in ambient conditions where heat is rejected. Alternatively, the condenser 8 can be used to heat a space that is designated for heating. This provides a flow of refrigerant from top to bottom in the apparatus shown in FIG. 1. As discussed below, the direction of flow can however be reversed.

The functionality of the evaporator 7 and condenser 8 may therefore be reversed and replaced by one another during different cycles.

Moreover, the evaporator 7 and condenser 8 may be replaced by other heat exchangers known in the art e.g. plate heat exchangers. The apparatus of the present invention is therefore highly adaptable for different situations.

There is also shown a valve 9 which in the embodiment shown in FIG. 1 is a reversing valve. The reversing valve 9 shown in FIG. 1 is, for example, a four-port reversing valve. The reversing valve 9 is used to reverse the flow when required to switch between discharging and/or hot gas defrost. Alternatives, are of course envisaged within the scope of the present invention and this could be reconfigured (i.e. replumbed) to enable a charging/discharge change using the reversing valve. The switching may occur manually or electronically and be dependent on the temperature and/or pressure being measured. Switching of the refrigerant flow may therefore be effected when required and/or triggered. For example, when heating is required refrigerant may flow from the heat battery 4 and when cooling is required the refrigerant flow may be switched to flow into the heat battery 4.

The apparatus also comprises a shut-off valve 10 which is connected to the condenser 8. The shut-off valve 10 may be an electronic or manual shut-off valve.

There is a further valve 11 which can also be used as a shut-off valve. The shut-off valve 11 may be an electronic or manual shut-off valve. The shut-off valve 11 is connected to the reversing valve 9 and the heat battery 4.

Connected to the condenser 8 there is a further valve 12 which, for example, functions as a check valve. The check valve 12 is also connected to the liquid containing vessel 13.

As shown in FIG. 1, the liquid containing vessel 13 is located above the compressor 1 and below the condenser 8. The apparatus shown in FIG. 1 should be considered as being vertically or substantially vertically oriented.

FIG. 1 also shows that there is a dryer 14 such as a filter dryer which is located preferably below the liquid containing vessel 13.

The apparatus may also optionally comprise a window for viewing such as a sight glass 15.

The apparatus also comprises an expansion device 16 (e.g. an expansion valve) which can be used for pre-cooling.

In the event that the expansion valve is electronic then the additional solenoid 16A shown in FIG. 1 is not required.

The valve 17 is also an expansion device and is similar to expansion valve 16. However, expansion valve 17 is used for discharge cooling. In the event that expansion valve 17 is electronic then the additional solenoid 17A is not required.

In FIG. 1, there is also shown a solenoid valve 18 located between the heat battery 4 and the reversing valve 9. The solenoid valve 18 is used to isolate the heat battery 4 when required.

The above solenoid valves may be used interchangeably with any controllable zone valve.

There is also a suction vessel accumulator 19 which can be used to expand refrigerant and ensure gas only return to the compressor.

There is also a crank-case pressure regulator 20. The crank-case pressure regulator 20 may preferably operate at, for example, about 2 Bar with a refrigerant such as R449A.

There is a further solenoid valve 21 connected to the heat battery 4 and the liquid containing vessel 13.

Additionally, there is a solenoid valve 22 which may be used for hot gas defrosting.

At the location points identified by reference numerals 24 and 25 a temperature and/or pressure measurement may be made by a series of temperature and/or pressure sensors.

The measurement of the temperature and/or pressure can be conducted using any suitable temperature and pressure measurement devices known in the art e.g. temperature and/or pressure measurement probes. This allows a temperature and/or pressure measurement to be made of the phase change material (PCM) 5 located within the heat battery 4. This has the specific technical advantage of being able to monitor and measure the pressure and/or temperature in the heat battery 4. This allows for feedback to the expansion valve which is regulating the refrigerant mass flowrate and for the complete system to be controlled in a very efficient manner and the system to be completely controllable. Switching of the refrigerant flow may therefore be effected at precise times and for maximum energy efficiency.

A specific aspect and advantage of the present invention is that the same apparatus as defined in FIG. 1 may be used to both heat and cool with the cycles being reversible. This means that an apparatus may be provided which may use the same compressor and refrigeration to both charge and cool thereby reducing the cost of such systems to an end user. This also means that the apparatus may be used and may be configured to be smaller than previously known devices using a smaller compressor and using a lower power. This is due to some of the work in the apparatus being done in shore power. This is a specific advantage of the present invention.

On the discharge cycle the apparatus will be required to transfer heat energy between the intermediate heat exchanger (i.e. the heat battery 5) and the temperature-controlled environment.

The apparatus shown in FIG. 1 operates via a refrigerant flow driven by a pressure differential across the compressor 1. It is this pressure differential that transfers heat across the apparatus. This pressure differential is dependent on the temperature the refrigerant is forced to evaporate at an evaporator coil in the evaporator 7 and the temperature it is forced to condense at a condensing coil in the condenser 8.

An example of the operation of the apparatus shown in FIG. 1 are shown below in Table 1 which shows the operation of the device during cooling and charging stages.

TABLE 1

| | | Valve Actuation (Top row specifies components in diagram) | | | | | | | |
|---|---|---|---|---|---|---|---|---|---|
| | | 9 | 17 | 16 | 11 | 10 | 18 | 21 | 22 |
| Compartment Cooling | Condense in 4 (PCM Discharge Cooling) | 0 | 1 | 0 | 1 | 0 | 0 | 1 | 0 |
| | Condense in 8 (Redundant Conventional Refrigeration) | 0 | 1 | 0 | 0 | 1 | 0 | 0 | 0 |
| Heat Battery Charging | Condense in 7 (Hot Gas Defrost) | 1 | 0 | 1 | 1 | 0 | 0 | 0 | 1 |
| | Condense in 8 (PCM Precooling) | 0 | 0 | 1 | 0 | 1 | 1 | 0 | 0 |

The above Table 1 can be used to configure electrical and/or mechanical control of refrigerant flow control valves in the present invention as annotated in the top row. In the top row the numerals refer to the components shown in FIGS. 1-5. For each component annotated the rows below give a binary indication of which valve position is required for that system mode of operation. In this instance '1' means open and '0' means closed.

FIG. 2 is a representation of the apparatus shown in FIG. 1 in a pre-cooling phase. The reference numerals used in FIG. 2 are therefore the same as that used in FIG. 1 with the same components.

In FIG. 2 the system flow path has been adjusted to enable the heat battery 4 to be cooled by an evaporation of refrigerant and for that absorbed heat to be rejected to the ambient air at the condenser 8. This is shown by the active flow path and the respective arrows. This mode of operation is called pre-cooling because it cools the phase change material (PCM) to a suitable charge temperature before the system is required to do active cooling of a temperature-controlled compartment.

Figure 3:
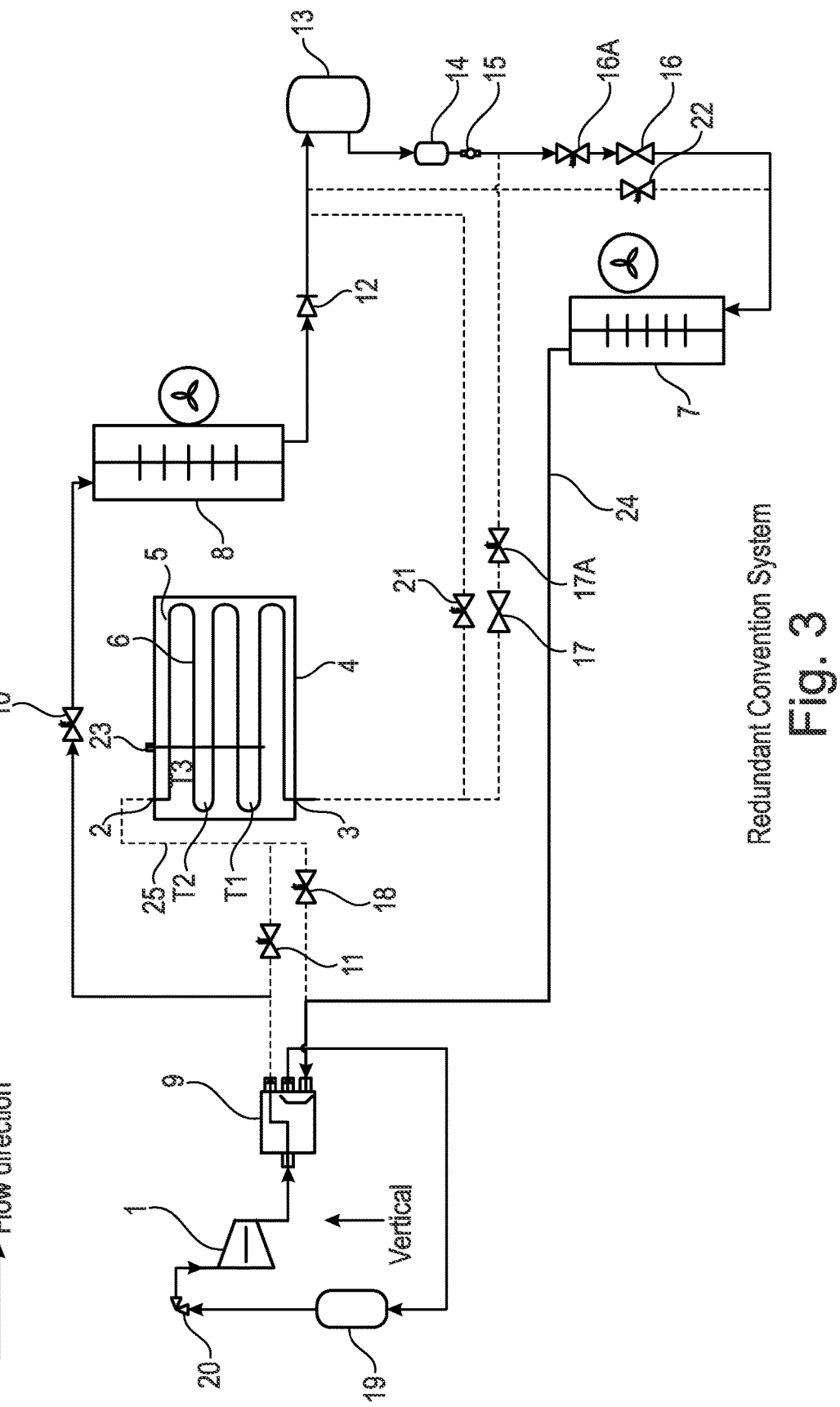
FIG. 3 is a representation of the apparatus shown in FIGS. 1 and 2 according to an embodiment of the present invention in a redundant convention phase.

FIG. 3 is a representation of the apparatus shown in FIGS. 1 and 2 in a mode of operation which is called a redundant conventional system phase. The reference numerals used in FIG. 3 are therefore the same as that used in FIGS. 1 and 2 with the same components.

In FIG. 3 the system flow path has been adjusted to enable the evaporator 7 to cool the temperature-controlled compartment and for that absorbed heat to be rejected to the ambient air at condenser 8. This mode of operation is called a redundant conventional system because it acts as a fail-safe mode of operation in such cases as the heat battery 4 becomes depleted.

Figure 4:
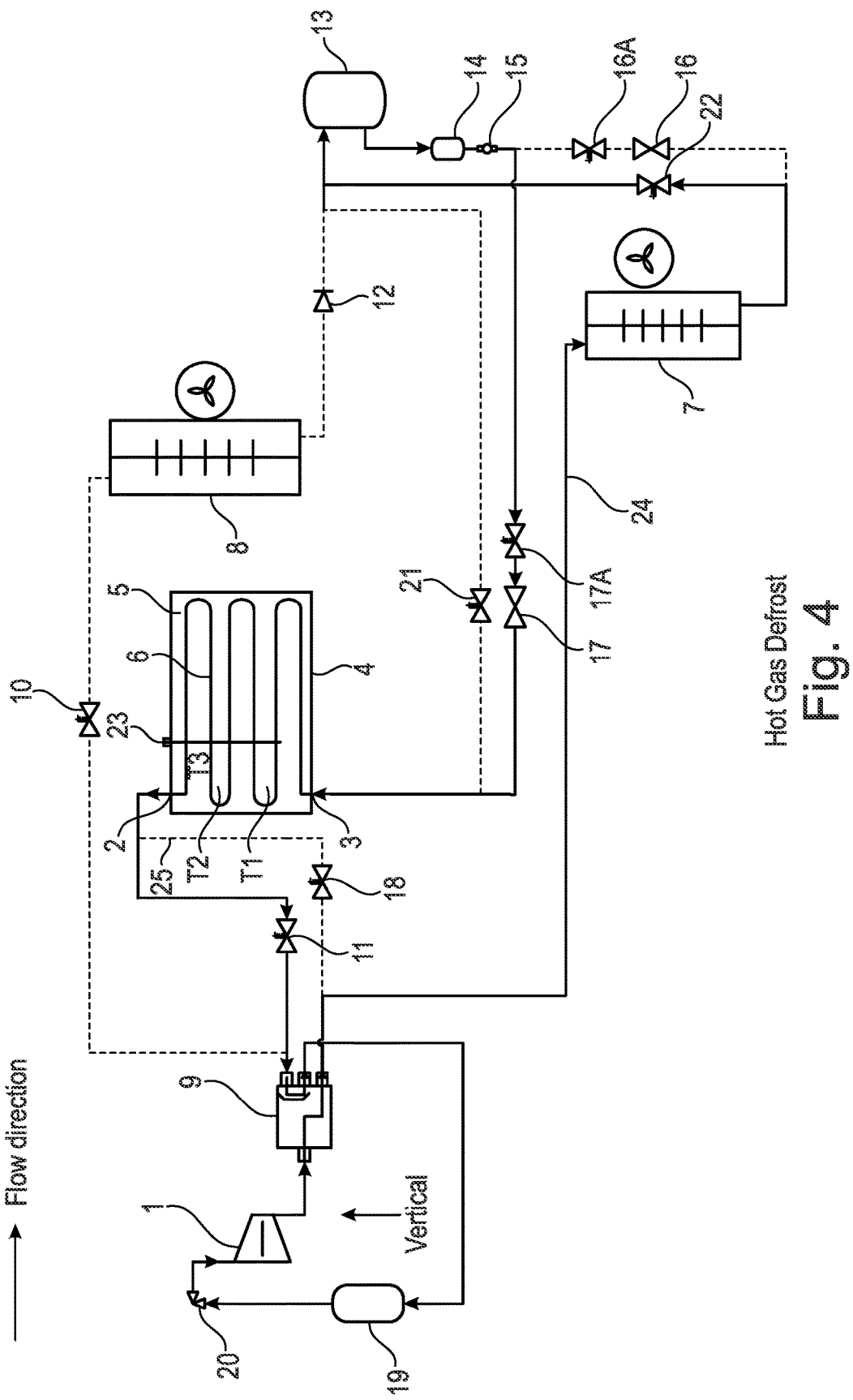
FIG. 4 is a representation of the apparatus shown in FIGS. 1, 2 and 3 according to an embodiment of the present invention in a hot gas defrost phase.

FIG. 4 is a representation of the apparatus shown in FIGS. 1 to 3 in a mode of operation called a hot gas defrost. The reference numerals used in FIG. 4 are therefore the same as that used in FIGS. 1 to 3 with the same components.

In FIG. 4 the system flow path has been adjusted to enable the evaporator 7 to be heated by a hot gas discharged by the compressor 1. This mode of operation is called a hot gas defrost because it is activated with the intention of melting any accumulated ice on the external fins of the evaporator 7 or on the casing body.

Figure 5:
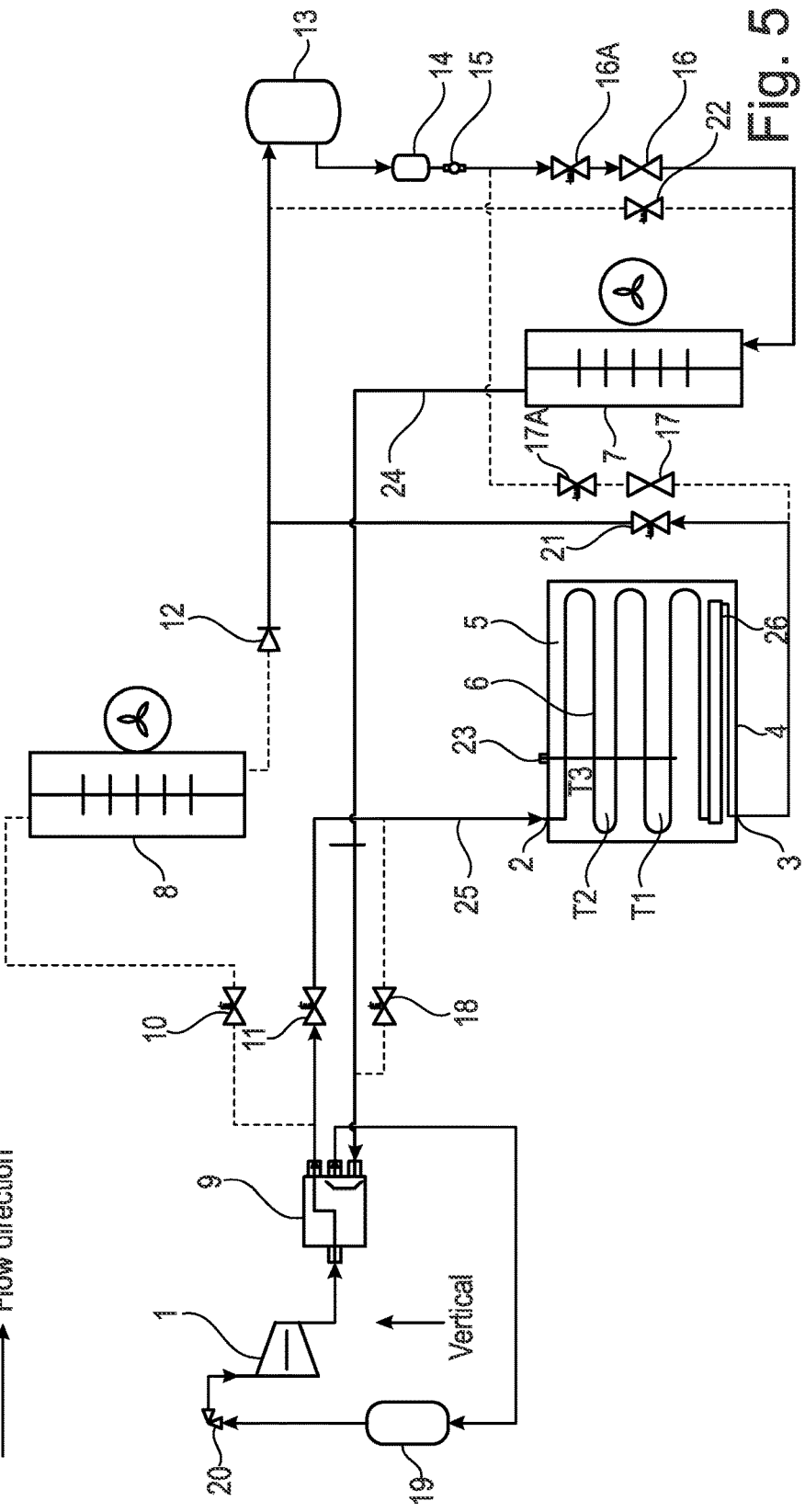
FIG. 5 is a representation of the apparatus shown in FIGS. 1 to 4 according to an embodiment of the present invention in a discharge cooling cycle phase.

FIG. 5 is a representation of the apparatus shown in FIGS. 1 to 4 in a discharge cooling cycle. The reference numerals used in FIG. 5 are therefore the same as that used in FIGS. 1 to 4 with the same components. In addition, FIG. 5 shows that located within the heat battery 4 there is an integrated liquid receiving compartment 26. The liquid receiving compartment 26 is located at or towards the bottom of the heat battery 4.

FIG. 5 shows the apparatus and components being used as a condenser only in a non-reversible system.

Table 2 below shows the operation of the apparatus in FIG. 5 when used as a condenser only.

TABLE 2

| | | Valve Actuation (Top Row specifies components in FIG. 5) | | | | | | | |
|---|---|---|---|---|---|---|---|---|---|
| | | 9 | 17 | 16 | 11 | 10 | 18 | 21 | 22 |
| Compartment Cooling | Condense in 4 (PCM Discharge Cooling) | 0 | 1 | 0 | 1 | 0 | 0 | 1 | 0 |
| | Condense in 8 (Ambient Cooling) | 0 | 1 | 0 | 0 | 1 | 0 | 0 | 0 |
| Heat Battery Charging | Condense in 7 (Hot Gas Defrost) | 1 | 0 | 1 | 1 | 0 | 0 | 0 | 1 |
| | Condense in 8 (PCM Precooling) | 0 | 0 | 1 | 0 | 1 | 1 | 0 | 0 |

Similar to above '1' means open and '0' means closed when referring to the different components in the system.

Figure 6:
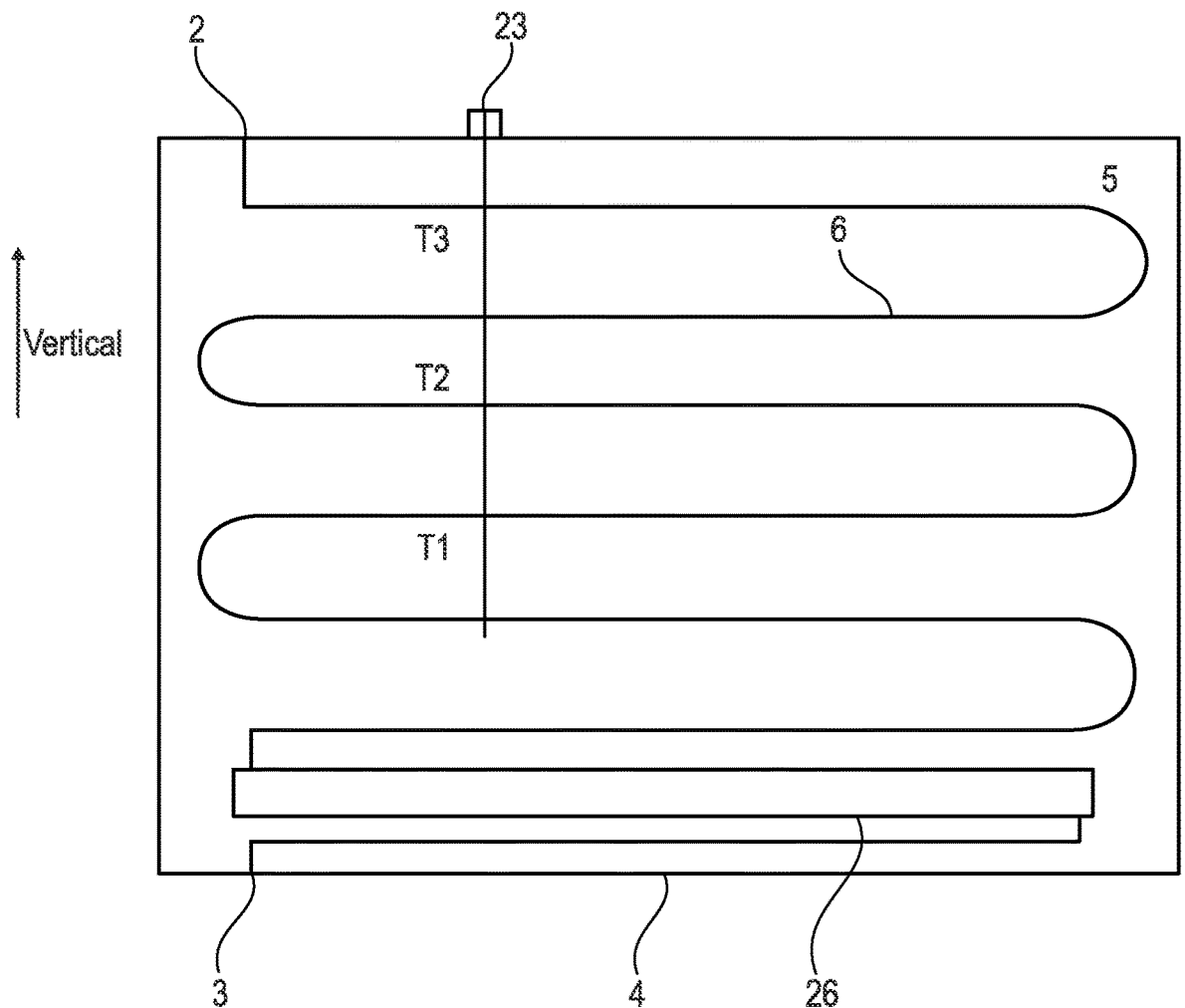
FIG. 6 is a representation of an expanded view of the heat battery shown in FIG. 5 according to an embodiment of the present invention.

FIG. 6 is an expanded view of the heat battery 4 shown in FIG. 5 where the apparatus is being used as a condenser only in a non-reversible system. There is shown the phase change material (PCM) 5 located within the battery, the series of tubes 6 and the temperature and/or pressure sensors 23. The heat battery 4 is also position in the vertical or substantially vertical position.

Figure 7:
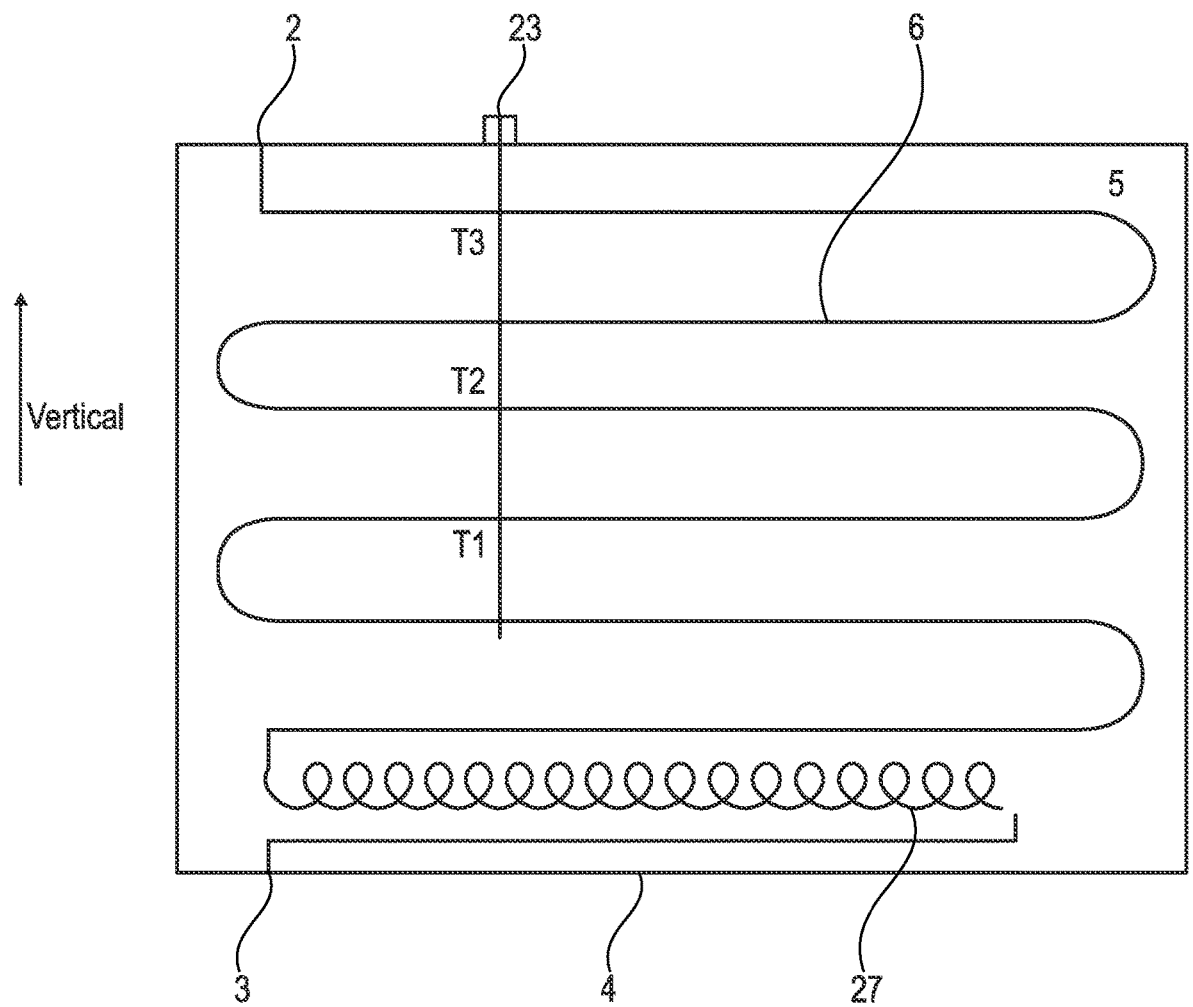
FIG. 7 is a representation of an alternative embodiment where there is a heat battery with an integrated capillary tube and the apparatus is being used as an evaporator only in a non-reversible system according to an embodiment of the present invention.

FIG. 7 is a representation of an alternative embodiment where there is a heat battery 4 with an integrated capillary tube 27. The apparatus in FIG. 7 is when the components are being used as an evaporator only in a non-reversible system.

Figure 8:
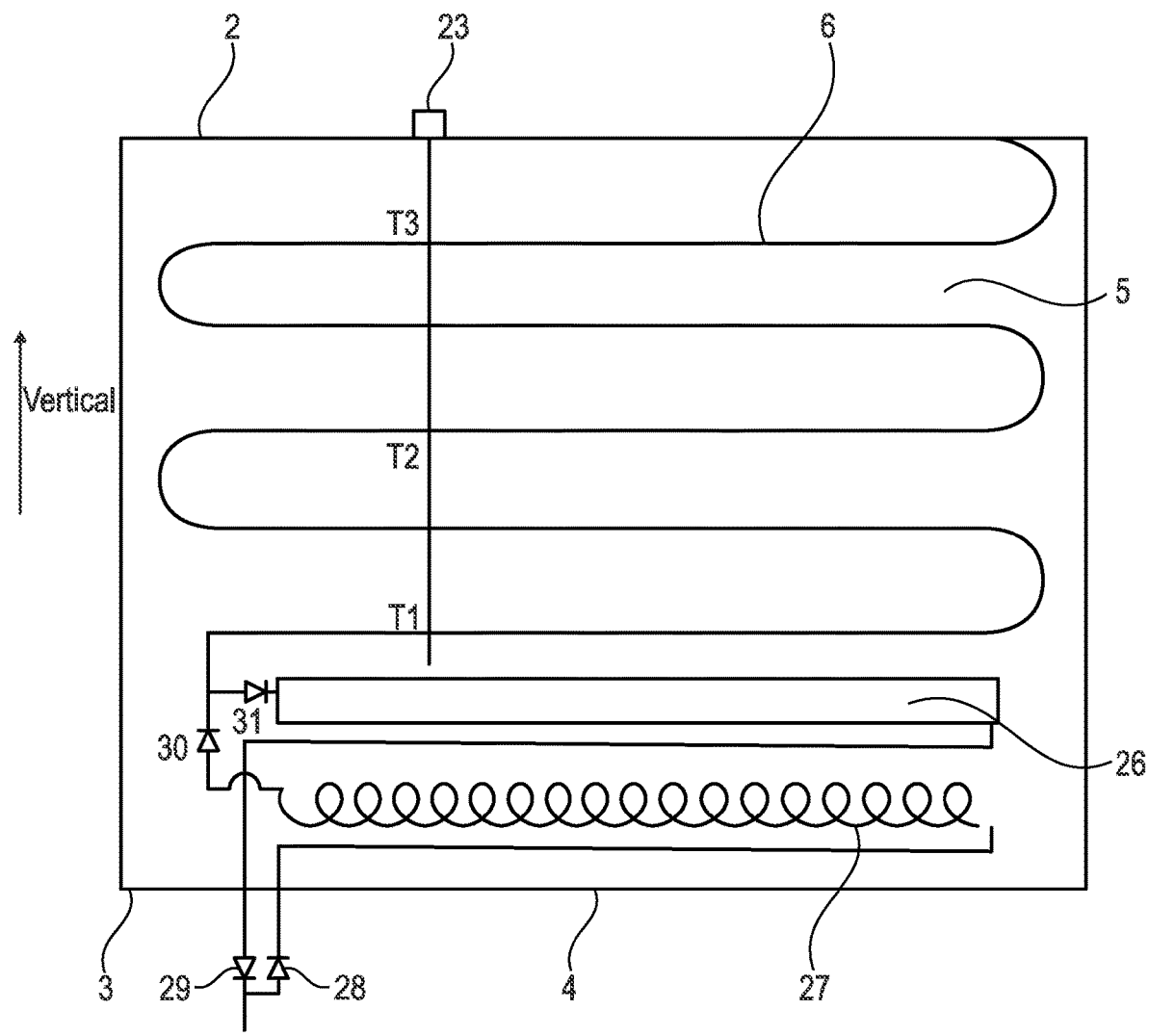
FIG. 8 is a representation of further embodiment where the apparatus is shown to comprise an integrated liquid receiver and a capillary tube where the apparatus is used in a reversible system phase according to an embodiment of the present invention.

FIG. 8 is a representation of an embodiment where the apparatus is shown to comprise an integrated liquid receiver 26 and a capillary tube 27. The apparatus and components are shown for a reversible system. Valves 28, 29, 30, 31 are shown which can be used to effect the necessary refrigerant flow.

Figure 9:
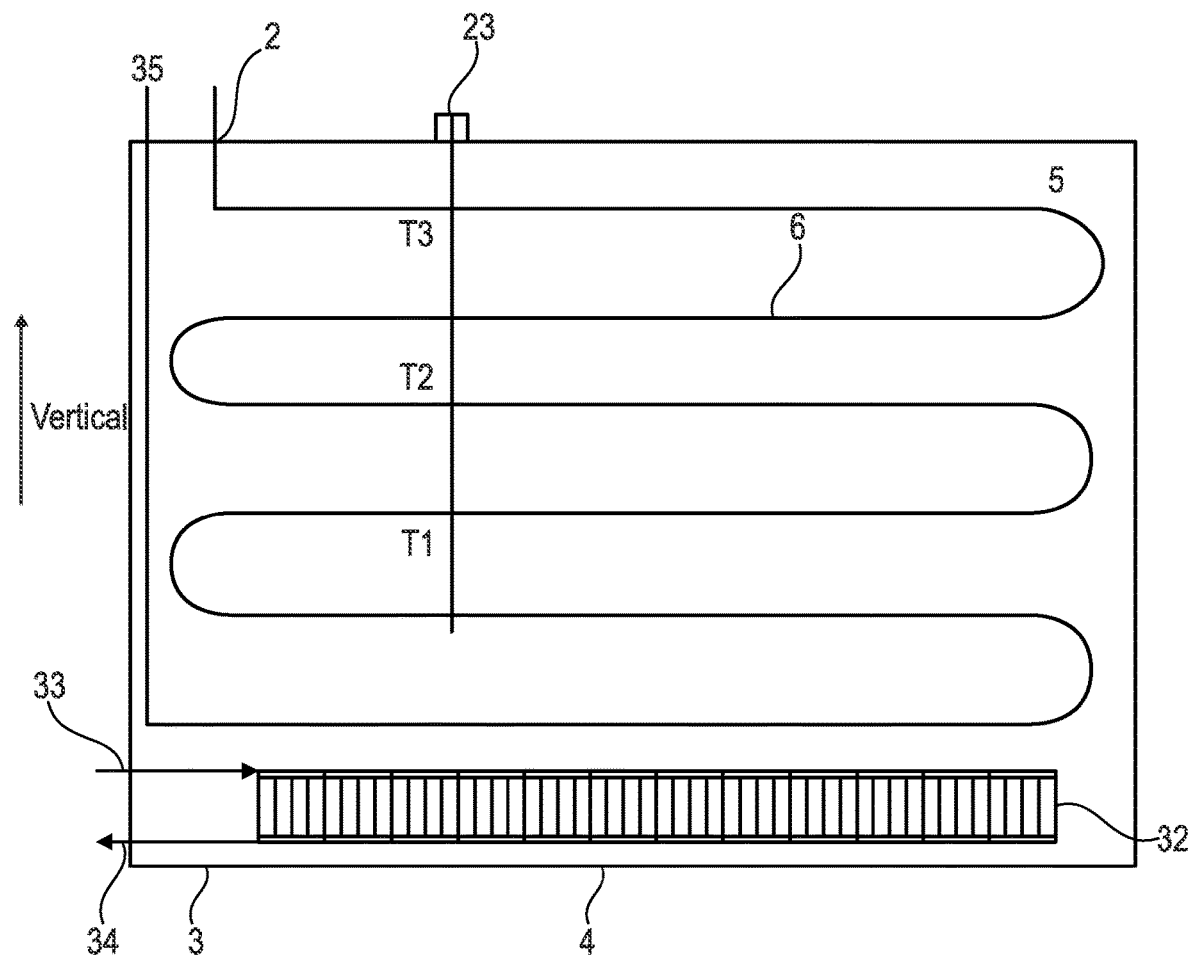
FIG. 9 is a representation of a yet further embodiment where the apparatus comprises a heat battery with an integrated microchannel heat exchanger used for condensing refrigerant and charging a heat battery according to an embodiment of the present invention.

FIG. 9 is a representation of a heat battery 4 with an integrated microchannel heat exchanger 32 used for condensing refrigerant and charging the heat battery 4. Refrigerant superheated gas will enter the microchannel heat exchanger at port 33, condense along the channels and exit as a liquid at port 34.

It is a design optimisation in the apparatus of the present invention to consider the temperature difference between the required control temperature and the chosen phase change material (PCM). By selecting a suitable phase change material (PCM), the pressure differential across the compressor will be both:

1) Large enough to encourage a refrigerant flow throughout the circuit the apparatus. Entirely dependent on pressure drops resulting from pipe lengths, diameters, orientation and line component geometry.

2) Small enough to minimise the work that the compressor needs to compress the refrigerant to it's required condensing pressure.

As an example to illustrate the present invention we refer to two vapour compression cycles:
1. Refrigeration system
2. Domestic heat pump For a refrigeration system the apparatus of the present invention will employ a heat battery that is pre-cooled and then provides cooling on the discharge. For pre-cooling, this can be achieved, for example, by mechanical or thermoelectric means of refrigeration, natural sources of waste cold. On the discharge the cooling effect could be used for uses like compartment cooling and industrial processes.

When pre-cooled using a refrigeration cycle, a heat exchanger will be immersed in the phase change material (PCM) and will be acting as an evaporator during the pre-cooling stage.

The phase change material (PCM) may be cooled into a sensible heat region of approximately 10° C. past its solidification point. For example, a phase change material (PCM) that freezes at about −5° C. could be cooled to a temperature of about −15° C. as a suitable precool set point depending on the specific operating conditions.

When the apparatus is operating in a discharge cooling stage, e.g. for preserving food produce, the heat exchanger refrigerant coil then acts as a condenser. Acting as a condenser the heat exchanger rejects heat from the refrigerant into the phase change material (PCM).

The storage capacity of the heat battery in the present invention is dependent on the mass of phase change material (PCM) used, so the heat sink will continue to absorb heat from the refrigeration cycle until that mass has been raised in temperature.

The heat battery is depleted when the phase change material (PCM) has melted and risen in temperature to approximately the ambient temperature. However, the designer may configure a specific refrigeration control to limit the temperature boundaries of pre-cooling and discharge cooling using standard temperature probes to trigger the refrigeration system to start and stop.

The limiting factor in relation to refrigeration cycles that use the ambient air as a heat sink is that the condensing pressure is climate dependent. Where maximum Summer temperatures in tropical climates range from about 30° C. to 40° C. this has a large effect on refrigeration system performance as the system is forced to compress the refrigerant to a pressure high enough to reject heat at a condensing temperature of approximately 35° C.-45° C.

Ambient conditions in tropical climates limits the designer in terms of component selection on the compressor because:
1. The compressor discharge temperature will become damaging at high temperatures, a typical compressor has a maximum allowance of about 120° C.-130° C.
2. The work a compressor does is proportional to the pressure difference between its inlet and outlet. The compressor size is generally chosen based on its ability to supplement the heat losses of a refrigerated compartment. Therefore, as a minimum requirement the chosen compressor must be able to maintain cooling for the range of ambient air conditions the system would expect to operate within.

Part of the benefit of using a heat battery as an intermediate storage as set out in FIGS. 1 to 5 in this type of tropical climate is that the pre-cooling of the heat battery can be carried out at night time, when the ambient temperature is at it's lowest. Then during the day when there is a demand for cooling the discharge cooling can be in operation.

This night/day time approach to cycling the heat battery is beneficial in a range of applications. For example, with electric refrigerated food trucks the pre-cooling cycle can be carried out at night when the truck is stationed at it's depot. This can employ shore power to run the pre-cooling cycle and the vehicle traction battery to power discharge cooling. In this example there is a benefit gained by reducing the drain on the vehicle traction battery and as a result leaving more energy available for driving the vehicle.

The phase change material (PCM) choice is critical to achieve suitable design operating conditions. In that material choice the designer should consider the target temperature of the cold compartment, the selection of phase change material (PCM) available and the relative saturation tables including pressures involved for refrigerants in use.

The closest prior art is substituting an airside heat exchanger with a water tank. In effect the water tank can be pre-cooled and provide discharge cooling using a refrigeration cycle.

Figure 10:
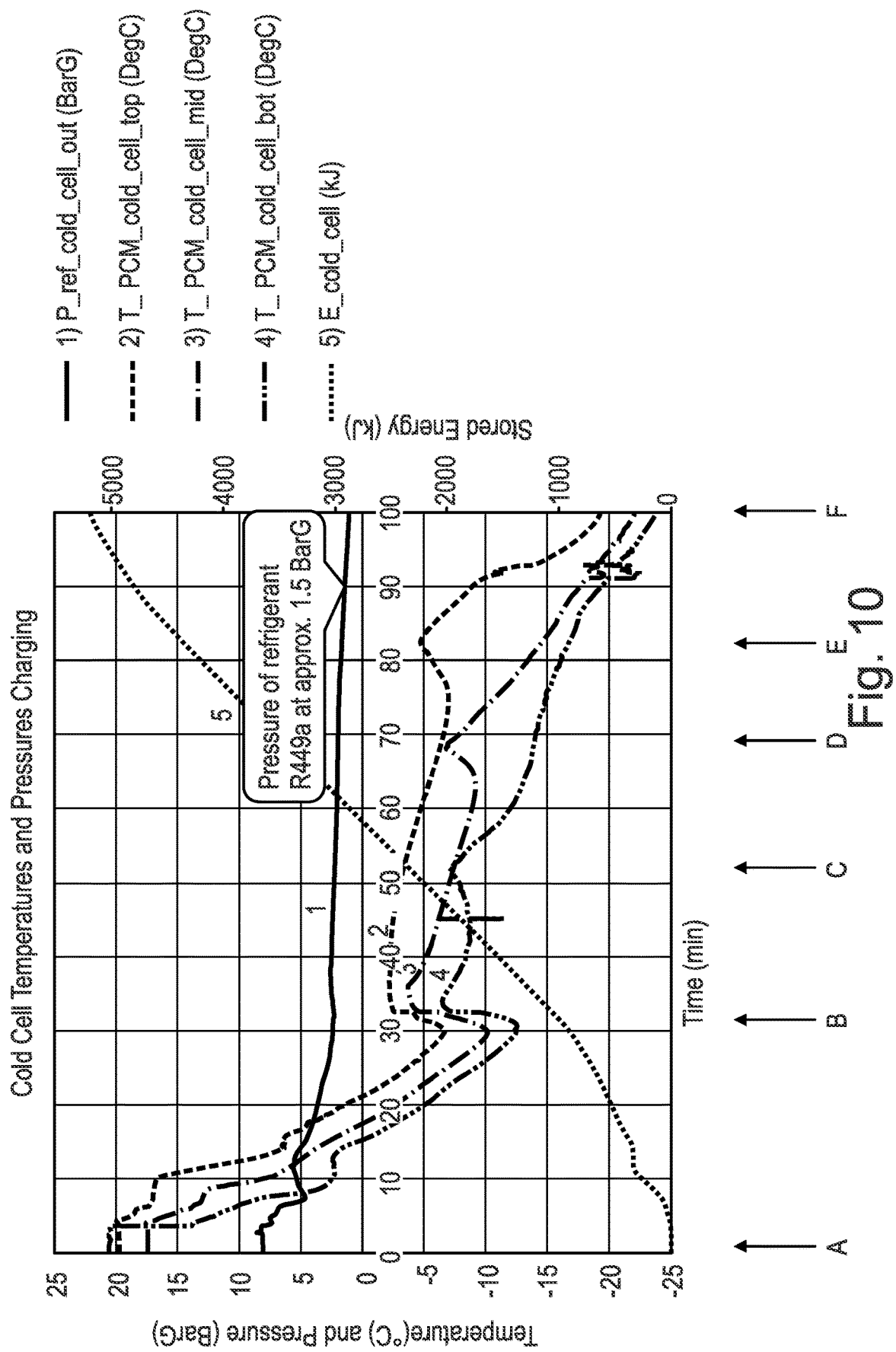
FIG. 10 is a representation of a cooling charge of the phase change material (PCM) with a phase change material (PCM) Transition Temperature according to an embodiment of the present invention.

FIG. 10 is a representation of a cooling charge of a phase change material (PCM) with a phase change material transition temperature PCM TT at about −5° C. The phase transition is characterised by latent heat region for the material, initialised by a supercooling of the phase change material (PCM) of about 3° C. to 15° C. below or about 5° C. below it's PCM TT and concluded by a temperature peak where an increase of temperature of about 2° C.-6° C. or about 3° C.-4° C. is observed before the material solidifies around a temperature probe.

These temperature phenomena allow for a very reliable method to indicate the heat battery charge.

In FIG. 10, the beginning of the heat battery charge is annotated by the letter A at 0 kJ of stored energy. In effect by observing the stored energy of the PCM total value at 5200 kJ the supercooling temperature indication in terms of a percentage can be determined for points B-F as follows:
B—Supercooling of PCM at about 900 kJ, therefore about 17.3% charged.
C—Temperature peak of bottom probe at about 2400 kJ, therefore about 46% charged
D—Temperature peak of bottom probe at about 3500 kJ, therefore about 67% charged
E—Temperature peak of bottom probe at about 4,400 kJ, therefore about 85% charged
F—PCM set point temperature reached for charging at about 100% charge.

Another method for monitoring the heat battery charge is by measuring the pressure of the refrigerant out of the heat battery upon evaporation. In FIG. 10, the final pressure reached when charging the cell is, for example, about 1.5 BarG. This pressure may be measured by installing a pressure transducer at the heat battery 4 outlet. A standard radiometric pressure transducer 0-5 Vdc, 0-34.5 BarA may be used.

Figure 11:
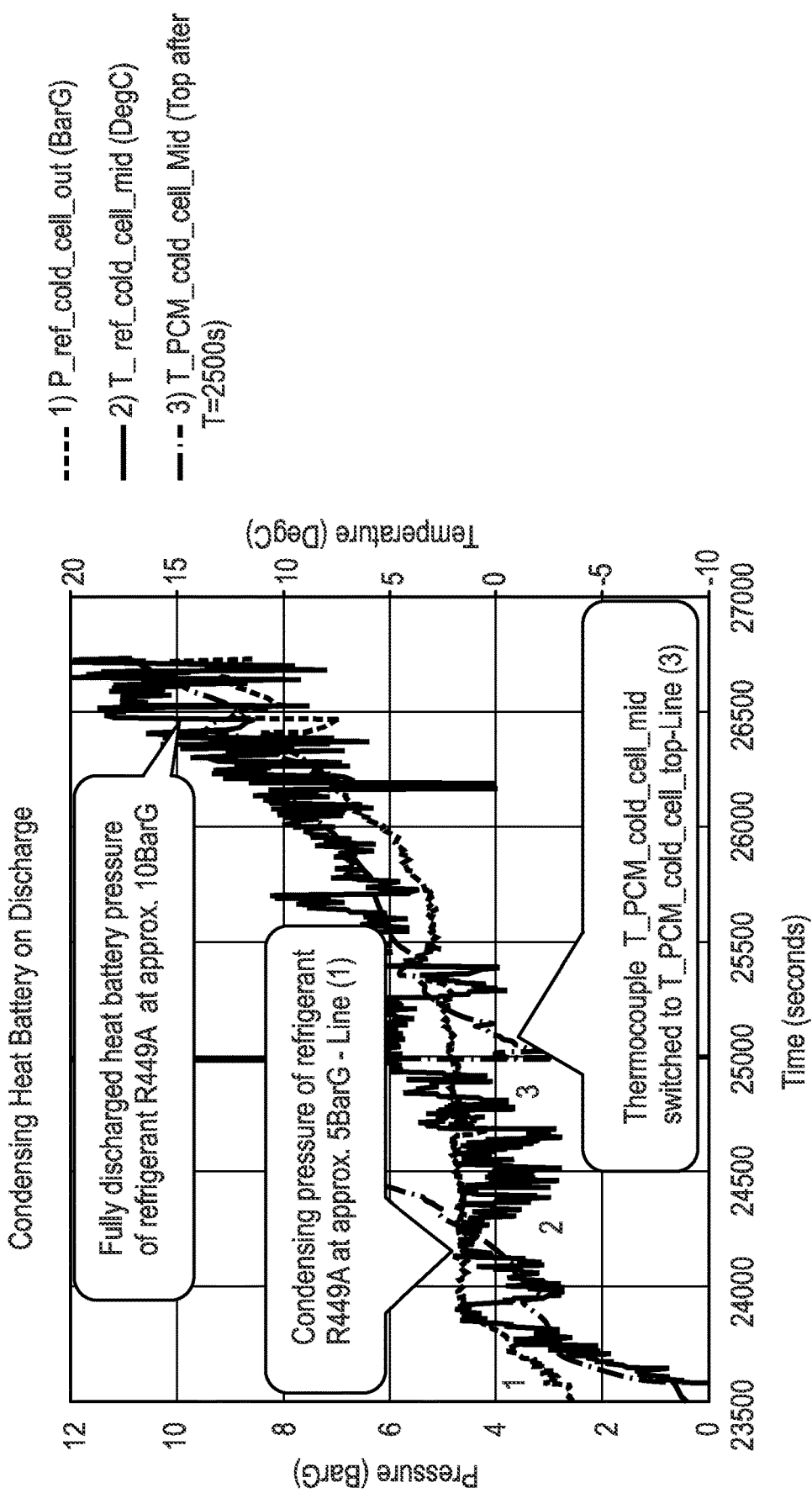
FIG. 11 is a representation of a heat battery discharge using a material with a phase change material (PCM) Transition Temperature (TT) of about −5° C.

FIG. 11 represents a heat battery discharge using a material with a phase change material transition temperature PCM TT at about −5° C.

The refrigerant condensing pressure is seen as expected by design to be approximately 5 BarG for R449a while the corresponding refrigerant condensing temperature at about 0° C.

During this test the measurement T_PCM_cold_cell_top had been switched manually with T_PCM_cold_cell_mid at time 2,500 seconds.

The pressure of indication on the discharge can be useful for alerting the user of two conditions.
When the heat battery is operating in the condensing latent heat region e.g. about 5 BarG
When the heat battery is fully discharged, e.g. about 10 BarG

Example 1—Cooling Specific Case: Refrigeration of a Compartment

Using the apparatus shown in FIG. 1, a vapour compression cycle has been developed to pre-cool a phase change material (e.g. magnesium sulphate) beyond its phase change temperature of −5° C., with a chosen pre-cool end temperature of about −20° C. Then the system is reversed to provide discharge cooling to a temperature-controlled compartment at about −20° C. In this study, the heat battery was depleted when the condensing temperature reached the ambient.

Using an Algorithm to Select a Phase Change Material (PCM) and/or Refigerant

Figure 12:
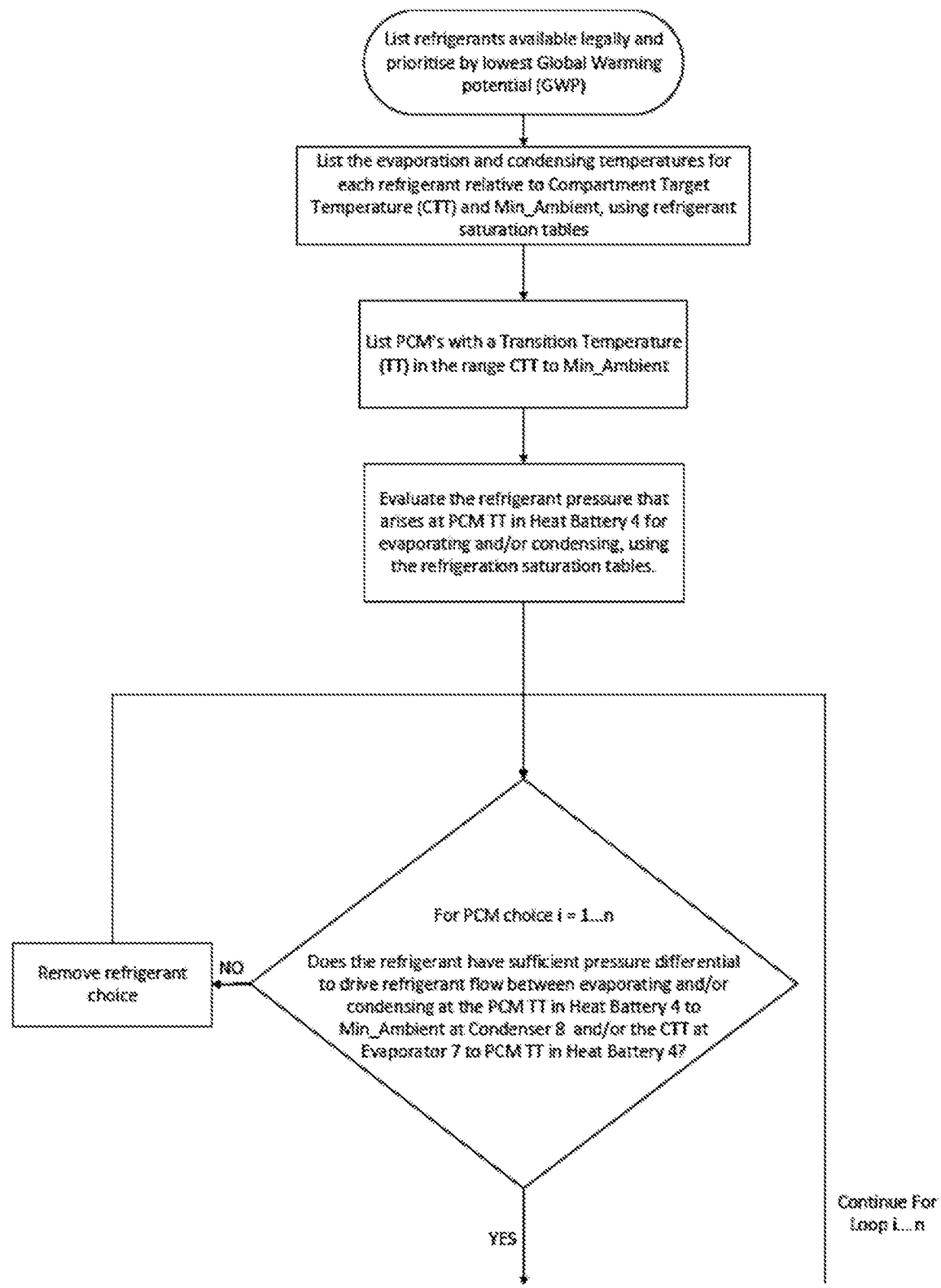
FIG. 12 is a representation of a methodology which allows a phase change material (PCM) and/or refrigerant to be selected for a particular use such as the apparatus shown in FIGS. 1-9 according to an embodiment of the present invention.

We now refer to FIG. 12 which is a representation of a methodology (i.e. an algorithm) which allows a phase change material (PCM) and/or refrigerant to be selected for a particular use. The methodology is split over two pages on figure pages 12/13 and 13/13 and should be read together.

FIG. 12 shows the choices that a user would go through to select the best phase change material (PCM) and/or refrigerant to be used in vapour compression apparatus such as shown in FIGS. 1-9.

As shown in FIG. 12, the first step is to list refrigerants available legally and prioritise by lowest global warming potential (GWP). Safety aspects of the refrigerant should also be taken into consideration.

A user will then list the evaporation and condensing temperatures for each refrigerant relative to Compartment Target Temperature (CTT) and minimum ambient temperature (Min_Ambient) using refrigerant saturation tables.

A user will then list the phase change materials (PCMs) with a Transition Temperature (TT) and the range of the Compartment Target Temperature (CTT) to the minimum ambient temperature (Min-Ambient). During this process, a user will also ensure that the phase change material (PCM) is suitable for the application with appropriate transition temperatures. Safety aspects will be taken into consideration. For example, a user will also take into consideration to select a phase change material (PCM) that has a Transition Temperature (TT) that operates over as much as possible of the condensing and evaporation temperatures and melting points or just below. As an example, to provide hot water a phase change material (PCM) may be selected which has a Transition Temperature (TT) of just below about 50° C.

Using the apparatus shown in FIGS. 1-9 a user will then evaluate the refrigerant pressure that arises in the phase change material (PCM) and the associated Transition Temperature (TT) in the heat battery 4 for evaporating and/or condensing. This may be performed using refrigeration saturation tables. For example, the refrigerant pressure in the heat battery may be measured using pressure sensors as previously described. The refrigerant pressure may also be measured in any other part of the vapour compression apparatus as required.

The next step in the process involves deciding whether the refrigerant has a sufficient pressure differential to drive refrigerant flow between evaporating and/or condensing at the phase change material (PCM) Transition Temperature (TT) in the heat battery 4 to the minimum ambient temperature (Min_Ambient) at condenser 8 and/or the Compartment Target Temperature (CTT) at evaporator 7 to the phase change material (PCM) Transition Temperature in the heat battery 4. In the event that the answer is 'NO' then the refrigerant is removed from the list as being an appropriate choice. In the event that the answer is 'YES' then the process shown in FIG. 12 is continued with.

The next step in the process would then involve using refrigerant saturation property tables and calculating the refrigerant thermodynamic state at points on the refrigeration cycle for evaporating and condensing at the phase change material (PCM) Transition Temperature (TT) to the minimum ambient temperature (Min-Ambient) during the refrigeration cycle and/or the Compartment Target Temperature (CTT) to the phase change material (PCM) refrigeration cycle:

- Compressor inlet refrigerant state
- Compressor outlet refrigerant state
- Condenser outlet refrigerant state
- Evaporator inlet refrigerant stat For example, the process shown in FIG. 12 therefore involves selecting a phase change material (PCM) and refrigerant for a heating application where the heating circuit should flow at between X and Y temperature, e.g. about 30-60° C. chosen by weather compensation, choose a PCM that is in the range X to Y or below X by using a looping process whereby an initial choice is made for each of PCM and refrigerant and then performing an iteration stage by changing one or the other. A Genetic Algorithm could also be used.

The looping process shown in FIG. 12 may therefore be used to select a phase change material (PCM) and refrigerant for a cooling application which comprises a cooling circuit with a cold compartment at X temperature, (e.g. about −10° C. to −30° C. or about −20° C.) and a hot ambient to which heat is to be rejected that varies between A and B temperature e.g. about 10° C. to 45° C.

The refrigerant must be an available refrigerant with a supply chain for refrigerant and related equipment such as compressors, expansion valves, etc.

Refrigerants will also be prioritised by their future availability as effected by legal requirements to lower the Global Warming Potential (GWP) of refrigerants in the market subjected to F-Gas regulations.

The refrigerant will be selected to evaporate during Discharge Cooling at about 2° C. to 10° C. below or typically about 5° C. below the compartment target temperature (CTT) at evaporator 7 and will be condensed in the heat battery 4 at a temperature 2° C. to 10° C. higher or typically about 5° C. higher than the chosen phase change materials (PCM') Transition Temperature (TT) (for a solid/liquid PCM this is the melting/freezing point; for a solid/solid PCM this is the temperature at which a solid crystal phase transition occurs). Evaporation must be at a pressure of about greater than about 3 BarA or about 1.5 BarA and less than about 10 BarA or less than about 5 BarA constraining the choice of refrigerant. This choice avoids starving the compressor of refrigerant or causing liquid refrigerant to enter the compressor.

During pre-cooling the refrigerant typically evaporates in the heat battery 4 about 2° C. to 10° C. below or typically about 5° C. below the chosen material (PCM) transition temperature (TT) and typically condenses in the ambient heat exchanger (e.g. fan coil) at a temperature about 2° C. to 10° C. higher or typically about 5° C. higher than the then-current ambient temperature.

The range from CTT is less than about 2° C. to 10° C. or typically less than about 5° C. to Max_Ambient temperature to greater than about 2° C. to 10° C. or greater than about 5° C. This must be within the feasible range for a single refrigerant in the case of a single compressor plus heat battery plus reversing valve arrangement. e.g. in this case about −25° C. to +50° C. Feasibility will be constrained by the maximum working pressure of the system, and the choice of heat exchanger, compressor, cost, manufacturability and safety that results from the pressure. Therefore, the maximum working pressure typically does not exceed about 30 BarA for a low cost system and about 200 BarA for an industrially feasible system. This closely constrains the number of refrigerants that can be chosen.

A further factor is that the phase change material (PCM) Transition Temperature (TT) is typically chosen based on the available phase change materials (PCMs), have acceptably high latent heat and must fall between the CTT and Min_Ambient.

Additional constraints apply based on the need to ensure that there is a minimum flow of refrigerant which means there must be a pressure difference of, for example, about 2-10 Bar or about 5 Bar or such other value as a person skilled in the art would specify.

Referring back to FIG. 12, the next step in the process is to calculate the heat load (Q) across the evaporator 7 such as shown in FIGS. 1-5 and/or condenser at heat battery 4 and condenser 8 and/or the evaporator 7 and heat battery 4 along with the relative compressor work (W) for that refrigeration cycle. The following equations may be used:

$$\dot{Q}=\dot{m}\Delta h$$

$$W=\dot{m}\Delta h$$

To illustrate the process of calculating the heat load (Q) we refer to the below.

When evaporating and condensing at the relative Compartment Target Temperature (CTT) at evaporator 7 and the phase change material (PCM) Transition Temperature (TT) in the heat battery 4 the cooling load ($Q_7$) and/or heating load ($Q_4$) are calculated as follows:

First from the design conditions specified for the cooling system, the overall heat loss of the compartment should be given. The cooling load at the evaporator ($Q_7$) should as a minimum compensate for this heat loss. For example, due to the insulation effectiveness of a temperature-controlled compartment the heat loss may, for example, be about 1 kW. The evaporator cooling load may, for example, be as a minimum about 1 kW. The actual cooling load to be selected by the designer can be decided include additional factors, for example, desired rate of cooling for the compartment, amount of door openings expected during operation.

Using refrigerant saturation property tables, we then calculate the refrigerant thermodynamic state at points on the refrigeration cycle for evaporating and condensing at the CTT to PCM TT refrigeration cycle.
Compressor inlet refrigerant state
Compressor outlet refrigerant state
Condenser outlet refrigerant state
Evaporator inlet refrigerant state
For those refrigerant states, find by looking up the saturation tables the relative enthalpy values for:
Compressor inlet refrigerant state ($h_1$)
Compressor outlet refrigerant state ($h_2$)
Condenser outlet refrigerant state ($h_3$)
Evaporator inlet refrigerant state ($h_4$)
The equation for calculating the cooling/heating load across a component is as follows:

$$Q=\dot{m}*\Delta h,$$

Therefore, as the cooling load for the evaporator 7 is already determined, the mass flow rate of refrigerant through evaporator 7 can be calculated as follows:

$$\dot{m}_7=Q_7/(h_4-h_1)$$

Knowing the mass flowrate of the refrigeration cycle allows you to calculate the subsequent heating load at heat battery 4 ($Q_4$) and work at compressor 1 ($W_1$).

When evaporating and condensing at the relative phase change transition temperature PCM TT in heat battery 4 and Min_ambient temperature in condenser 8 the cooling load ($Q_4$) and/or heating load ($Q_8$) are calculated as follows:

First the cooling load ($Q_4$) in heat battery 4 will be chosen by the designer based on the desired rate of cooling for the heat battery.

Using refrigerant saturation property tables, then calculate the refrigerant thermodynamic state at points on the refrigeration cycle for evaporating and condensing on the PCM TT to Min_Ambient refrigeration cycle.
Compressor inlet refrigerant state
Compressor outlet refrigerant state
Condenser outlet refrigerant state
Evaporator inlet refrigerant state
For those refrigerant states, find by looking up the saturation tables the relative enthalpy values for:
Compressor inlet refrigerant state ($h_1$)
Compressor outlet refrigerant state ($h_2$)
Condenser outlet refrigerant state ($h_3$)
Evaporator inlet refrigerant state ($h_4$)
The equation for calculating the cooling/heating load across a component is as follows:

$$Q=\dot{m}*\Delta h,$$

Therefore, as the cooling load for the heat battery 4 is already determined, the mass flow rate of refrigerant through heat battery 4 can be calculated as follows:

$$\dot{m}_4=Q_4/(h_4-h_1)$$

Knowing the mass flowrate of the refrigeration cycle allows you to calculate the subsequent heating load at condenser 8 ($Q_8$) and work at compressor 1 ($W_1$).

Referring back to FIG. 12, a user will then calculate the coefficient of performance (COP) for heating and/or cooling by dividing the relative condenser and/or evaporator heat load by the compressor work.

The refrigerant and phase change material (PCM) data may then be added to a final review document.

Finally, experimentation may be conducted in suitable phase change material (PCM) refrigerant combinations listed, prioritised by lowest Global Warming Potential (GWP) of refrigerant.

A very specific example would be as follows:
1. Choose lowest GWP and legally allowed refrigerants and choose a candidate
2. Look at the candidate's pressure range
3. Where does it evaporate and condense relative to CTT and Min_Ambient
4. For a list of PCMs with Transition Temperatures in the range CTT to Min_Ambient, evaluate for each the Refrigerant Pressure that arises at the Transition Temperature
5. Clip the list to remove all candidates that have insufficient pressure differential to drive refrigerant flow between evaporating and condensing on the PCM TT to Min_Ambient refrigeration cycle and/or the CTT to PCM refrigeration cycle.
6. Using refrigerant saturation property tables, calculate the refrigerant thermodynamic state at four points on the refrigeration cycle for evaporating and condensing on the PCM TT to Min_Ambient refrigeration cycle and/or the CTT to PCM refrigeration cycle:
Compressor inlet refrigerant state
Compressor outlet refrigerant state
Condenser outlet refrigerant state
Evaporator inlet refrigerant state
7. Calculate the heat load (kW) across the evaporator and/or condenser and compressor work (kW) for each refrigeration cycle defined in point 6 above. Using this information the coefficient of performance (COP) for heating and/or cooling can be determined for each pairing of refrigerant and PCM.

The algorithm may be used to select a PCM and refrigerant combination for a heating specific case by considering first the heating requirement on the condenser providing space and/or hot water and/or heat battery heating. The heating requirement should be set by the design specifications for the system or for the choice of the designer. For example to provide heat battery charging at a rate of, for example, about 2 kW and for a PCM temperature of, for example, about 58° C., resulting in a refrigerant condensing temperature of about 63° C. From this information the subsequent steps of the algorithm may be used to find the thermodynamic states of the refrigerant heating cycle and of the mass flow rate of that cycle. Then the selection of the PCM for the low temperature heat battery can be determined by iterating through the available materials and refrigerants.

Whilst specific embodiments of the present invention have been described above, it will be appreciated that departures from the described embodiments may still fall within the scope of the present invention. For example, any suitable type of compressor, condenser, evaporator and heat battery comprising phase change material may be used. Moreover, any suitable type and network of plumbing may be used to connect the devices to achieve the objectives of the present invention. Furthermore, any suitable type of phase change material (PCM) may be used.

The invention claimed is:

1. A vapour compression apparatus comprising:
   a pumping device which is used to pump a refrigerant;
   a condenser which is capable of condensing the refrigerant;
   an evaporator which is capable of evaporating the refrigerant;
   a heat battery comprising a phase change material (PCM);
   a series of temperature and/or pressure sensors capable of monitoring the temperature and/or pressure of the phase change material (PCM) in the heat battery;
   wherein the heat battery is capable of being connected to the condenser and/or evaporator to release charge energy and/or be charged whereby the heat battery is capable of controlling the temperature of a heat source and/or heat sink temperature in a vapour compression cycle;
   wherein the series of temperature and/or pressure sensors are immersed in the phase change material (PCM) which provides a real-time measurement of the temperature and/or pressure of the heat battery, thereby providing an indication of when a refrigerant flow direction should be switched.

2. A vapour compression apparatus according to claim 1, wherein the temperature and/or pressure measurements are conducted constantly and/or continuously or periodically.

3. A vapour compression apparatus according to claim 1, wherein the series of temperature and/or pressure sensors provide real-time temperature and/or pressure measurements which allows the temperature and/or pressure of the phase change material (PCM) to be monitored along with a measurement of the level of charge in the phase change material (PCM).

4. A vapour compression apparatus according to claim 1, wherein the heat battery comprising phase change material (PCM) is located intermediary between the condenser and evaporator; and wherein the heat battery provides an intermediary stage between the condenser and evaporator which are functioning as either a heat source and/or heat sink.

5. A vapour compression apparatus according to claim 1, wherein during a first stage the heat battery pre-cools or pre-heats and during a second stage the heat battery discharges cooling or discharges heating; and wherein the heat battery functions as an intermediary located heat exchanger.

6. A vapour compression apparatus according to claim 1, wherein the apparatus is in a vertical orientation wherein a liquid containing vessel containing refrigerant is located above the compressor and the liquid containing vessel is located vertically between the evaporator and the condenser; and wherein the pumping device is a which compressor is used to compress and/or pressurise the refrigerant around a system of pipes about the apparatus.

7. A vapour compression apparatus according to claim 1, wherein the phase change material (PCM) used includes any one of or combination of the following:
   a paraffin material forming a PCM with a phase change transition temperature of about 25° C. to 35° C. or about −30° C.;
   a salt-water eutectic forming a PCM with a phase change transition temperature of about 20° C. to 25° C. or about −22° C.;
   a salt-water eutectic forming a PCM with a phase change transition temperature of about −10° C. to 0° C.;
   a salt-water eutectic forming a PCM with a phase change transition temperature of about −5° C. to +5° C.;
   an organic ester forming a PCM with a phase change transition temperature of about 0° C. to 10° C.;
   a clathrate hydrate forming a PCM with a phase change transition temperature of about 0° C. to 10° C.;
   an ester forming a PCM with a phase change transition temperature of about 15° C. to 25° C.;
   a fatty alcohol forming a PCM with a phase change transition temperature of about 15° C. to 25° C.;
   a salt hydrate forming a PCM with a phase change transition temperature of about 25° C. to 35° C.;
   a salt hydrate forming a PCM with a phase change transition temperature of about 0° C. to 10° C.;
   a polyol with a solid-solid phase change forming a PCM with a phase change transition temperature of about 70° C. to 95° C.; and
   a polyol forming a PCM with a phase change transition temperature of about 100° C. to 150° C.

8. A vapour compression apparatus according to claim 1, wherein the phase change material (PCM) is selected from a temperature range that is not as low as desired to cool to or as high as desired to reject heat to; and wherein the phase change material (PCM) is selected which has a phase change temperature of about 1° C.-20° C. above the temperature required to cool to and/or the phase change temperature that causes a refrigerant to condense with a pressure of about 1-10 BarG above the pressure of the required evaporation pressure.

9. A vapour compression apparatus according to claim 1, wherein a phase change material (PCM) is selected which has a phase change temperature of about 1° C.-20° C. above the temperature of the ambient condition in which the heat pump is sourcing its heat energy and/or the phase change temperature that causes a refrigerant to evaporate with a pressure of about 1-10 BarG above the pressure refrigerant would evaporate at, at the design conditions minimum ambient temperature.

10. A vapour compression apparatus according to claim 1, wherein located within the heat battery there is a series of tubes; and wherein the evaporator is a fan coil evaporator.

11. A vapour compression apparatus according to claim 1, wherein the functionality of the evaporator and condenser is reversible during different cycles.

12. A vapour compression apparatus according to claim 1, further comprising a reversing valve configured to reverse the refrigerant flow direction and switch between charging and/or discharging; wherein the switching occurs manually or electronically and is dependent on the temperature and/or pressure being measured and when switching is required; wherein when heating is required refrigerant flows from the heat battery and when cooling is required refrigerant flows into the heat battery; and wherein a check valve is connected to the condenser and a liquid containing vessel.

13. A vapour compression apparatus according to claim 1, further comprising a dryer; a window for viewing; expansion devices which are used for pre-cooling; at least one solenoid valve located between the heat battery and a reversing valve which is used to isolate the heat battery when required; and a suction vessel accumulator which is used to direct the refrigerant flow direction.

14. A vapour compression apparatus according to claim 1, further comprising a solenoid valve connected to the heat battery and a liquid containing vessel which is used for hot gas defrosting.

15. A method for controlling the temperature of a heat source and/or heat sink temperature in a vapour compression cycle using the apparatus according to claim 1.

16. A vapour compression apparatus according to claim 1, wherein the temperature and/or pressure measurements are conducted every 30 seconds.

17. A vapour compression apparatus according to claim 1, wherein the temperature and/or pressure measurements are conducted every minute.

18. A vapour compression apparatus according to claim 1, wherein the phase change material (PCM) is selected which has a phase change temperature of about 10° C.-15° C. above the temperature of the ambient condition in which the heat pump is sourcing its heat energy and/or the phase change temperature that causes a refrigerant to evaporate with a pressure of about 1-10 BarG above the pressure refrigerant would evaporate at, at the design conditions minimum ambient temperature.

19. A vapour compression apparatus according to claim 1, wherein a phase change material (PCM) is selected which has a phase change temperature of about 10° C.-15° C. above the temperature of the ambient condition in which the heat pump is sourcing its heat energy and/or the phase change temperature that causes a refrigerant to evaporate with a pressure of about 1-5 BarG above the pressure refrigerant would evaporate at, at the design conditions minimum ambient temperature.

20. A vapour compression apparatus according to claim 1, wherein a phase change material (PCM) is selected which has a phase change temperature of about 10° C.-15° C. above the temperature of the ambient condition in which the heat pump is sourcing its heat energy and/or the phase change temperature that causes a refrigerant to evaporate with a pressure of about 1-5 BarG above the pressure refrigerant would evaporate at, at the design conditions minimum ambient temperature.

* * * * *